(12) United States Patent
Chen et al.

(10) Patent No.: US 11,463,944 B2
(45) Date of Patent: Oct. 4, 2022

(54) ELECTRONIC DEVICE FOR PERFORMING NODE SELECTION BASED ON SYSTEM INFORMATION BLOCK AND OPERATION METHOD THEREOF

(71) Applicant: Samsung Electronics Co., Ltd., Suwon-si (KR)

(72) Inventors: Hung-Yueh Chen, Suwon-si (KR); Inshik Kang, Suwon-si (KR); Kipyo Nam, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/037,218

(22) Filed: Sep. 29, 2020

(65) Prior Publication Data
US 2021/0168700 A1 Jun. 3, 2021

(30) Foreign Application Priority Data
Nov. 29, 2019 (KR) .......................... 10-2019-0157049

(51) Int. Cl.
*H04W 48/16* (2009.01)
*H04W 84/04* (2009.01)

(52) U.S. Cl.
CPC .......... *H04W 48/16* (2013.01); *H04W 84/042* (2013.01)

(58) Field of Classification Search
CPC .............................................. H04W 48/16–18
See application file for complete search history.

(56) References Cited

U.S. PATENT DOCUMENTS

| | | | |
|---|---|---|---|
| 8,989,742 B2* | 3/2015 | Ramachandran | H04W 48/18 455/436 |
| 10,893,448 B2* | 1/2021 | Panchai | H04L 5/0098 |

(Continued)

FOREIGN PATENT DOCUMENTS

| | | |
|---|---|---|
| KR | 10-2016-0134439 A | 11/2016 |
| WO | 2019/090763 A1 | 5/2019 |

(Continued)

OTHER PUBLICATIONS

International Search Report dated Nov. 27, 2020 in connection with International Patent Application No. PCT/KR2020/011747, 3 pages.

(Continued)

*Primary Examiner* — Qutbuddin Ghulamali

(57) ABSTRACT

An electronic device may include at least one communication processor and an application processor. The at least one communication processor is configured to: receive first system information including information on whether at least one node supporting first cellular communication supports DC or second system information including information on a node which is adjacent to the at least one node and supports second cellular communication, from the at least one node via the first cellular communication; update, based on the first or second system information, a database which includes information indicating whether the at least one node supports the DC and information indicating whether the node adjacent to the at least one node supports the second cellular communication; determine, based on the updated database, a searching order of at least one node included in the updated database; and search for a node to be registered, based on the determined searching order.

20 Claims, 12 Drawing Sheets

(56) References Cited

U.S. PATENT DOCUMENTS

| | | | |
|---|---|---|---|
| 2012/0322447 A1* | 12/2012 | Ramachandran | H04W 48/18 |
| | | | 455/436 |
| 2016/0337946 A1 | 11/2016 | Kim et al. | |
| 2019/0223091 A1* | 7/2019 | Huang-Fu | H04L 5/0091 |
| 2020/0359286 A1 | 11/2020 | Tang | |
| 2021/0168700 A1* | 6/2021 | Chen | H04W 48/16 |

FOREIGN PATENT DOCUMENTS

| | | |
|---|---|---|
| WO | 2019/105056 A1 | 6/2019 |
| WO | 2019137517 A1 | 7/2019 |

OTHER PUBLICATIONS

Written Opinion of the International Searching Authority dated Nov. 27, 2020 in connection with International Patent Application No. PCT/KR2020/011747, 6 pages.

* cited by examiner

ELECTRONIC DEVICE FOR PERFORMING NODE SELECTION BASED ON SYSTEM INFORMATION BLOCK AND OPERATION METHOD THEREOF

CROSS-REFERENCE TO RELATED APPLICATION

This application is based on and claims priority under 35 U.S.C. 119 to Korean Patent Application No. 10-2019-0157049, filed on Nov. 29, 2019, in the Korean Intellectual Property Office, the disclosure of which is herein incorporated by reference in its entirety.

BACKGROUND

1. Field

Various embodiments relate to an electronic device and an operation method of the electronic device and, particularly, to a technology for selecting a node to be registered, based on a system information block broadcast by the node.

2. Description of Related Art

As various electronic devices such as smart phones, tablet personal computers (PCs), portable multimedia players (PMPs), personal digital assistants (PDAs), laptop PCs, and wearable devices are distributed, various wireless communication technologies used for communication by various electronic devices are being developed.

In order to meet wireless data traffic demands that have increased after 4th generation (4G) communication system commercialization, efforts to develop an improved 4th generation (5G) communication system or a pre-5G communication system have been made. For this reason, the 5G communication system or the pre-5G communication system is called a beyond 4G network communication system or a post long term evolution (LTE) system. In order to achieve a high data transmission rate, an implementation of the 5G communication system in a mmWave band (for example, 60 GHz band) is being considered. In the 5G communication system, technologies such as beamforming, massive multi-input multi-output (MIMO), full Dimensional MIMO (FD-MIMO), array antenna, analog beam-forming, and large scale antenna are being discussed as means to mitigate a propagation path loss in the mm Wave band and increase a propagation transmission distance.

The above information is presented as background information only to assist with an understanding of the disclosure. No determination has been made, and no assertion is made, as to whether any of the above might be applicable as prior art with regard to the disclosure.

SUMMARY

Fifth-generation communication may support a node (or a base station) capable of transmitting or receiving data through a frequency band of 6 GHz or less and a node capable of transmitting or receiving data through a frequency band of 6 GHz to 28 GHz. The frequency band used for the fifth-generation communication may have a feature wherein the frequency band is broader than those for the other communication forms. Due to this feature, an electronic device to be connected to a node that supports the fifth-generation communication may spend much time on searching for a node to be registered. In addition, an electronic device that supports fourth-generation communication and fifth-generation communication may spend much time on searching for a node to which to connect according to a terminal access priority and node installation characteristics. A user may be inconvenienced by the time spent on searching for the node to be registered.

Furthermore, even though an electronic device can be registered at a node supporting a relatively high data transfer rate, the electronic device may be registered at another found node.

An electronic device according to various embodiments may include: at least one communication processor; and an application processor, wherein the at least one communication processor is configured to: receive first system information, including information on whether at least one node supporting first cellular communication supports dual connectivity (DC), or second system information, including information on a node which is adjacent to the at least one node and supports second cellular communication, from the at least one node via the first cellular communication; update, based on the first system information or the second system information, a database which includes information indicating whether the at least one node supports the DC and information indicating whether the node adjacent to the at least one node supports the second cellular communication; determine, based on the updated database, a searching order of at least one node included in the updated database; and search for a node to be registered, based on the determined searching order.

An operation method of an electronic device according to various embodiments may include: receiving first system information, including information on whether at least one node supporting first cellular communication supports dual connectivity (DC), or second system information, including information on a node which is adjacent to the at least one node and supports second cellular communication, from the at least one node via the first cellular communication; updating, based on the first system information or the second system information, a database which includes information indicating whether the at least one node supports the DC and information indicating whether the node adjacent to the at least one node supports the second cellular communication; determining, based on the updated database, a searching order of at least one node included in the updated database; and searching for a node to be registered, based on the determined searching order.

An electronic device and an operation method thereof according to various embodiments can, before selecting for a node to be registered, generate or update a database based on at least one of first system information, indicating whether a node positioned near the electronic device supports dual connectivity (DC) for broadcasting, or second system information, indicating whether the node supports second cellular communication, and can search for the node to be registered, based on the database. Therefore, it is possible to implement faster searching than when searching for a node in all frequency bands supported by the electronic device, and to reduce a delay time which may be caused by node searching.

An electronic device and an operation method thereof according to various embodiments can determine a node-searching order based on a cellular communication type stored in a database and can perform node searching by using the determined searching order. Therefore, the electronic device can be prevented from being connected to a node other than a node capable of implementing a relatively fast data communication speed and can implement a relatively high data transfer rate.

An electronic device and an operation method thereof according to various embodiments can search for a node beginning with a low frequency band among frequency bands supported by the electronic device when node searching based on a database is determined to be unsuccessful. A node supporting data communication through a low frequency band can have wider cell coverage than a node supporting data communication through a relatively high frequency band, and thus can perform faster cell searching.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the disclosure and its advantages, reference is now made to the following description taken in conjunction with the accompanying drawings, in which like reference numerals represent like parts:

FIG. 4B illustrates a wireless communication system for providing a network of legacy communication and 5G communication according to various embodiments, and FIG. 4C illustrates a wireless communication system for providing a network of legacy communication and 5G communication according to various embodiments;

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
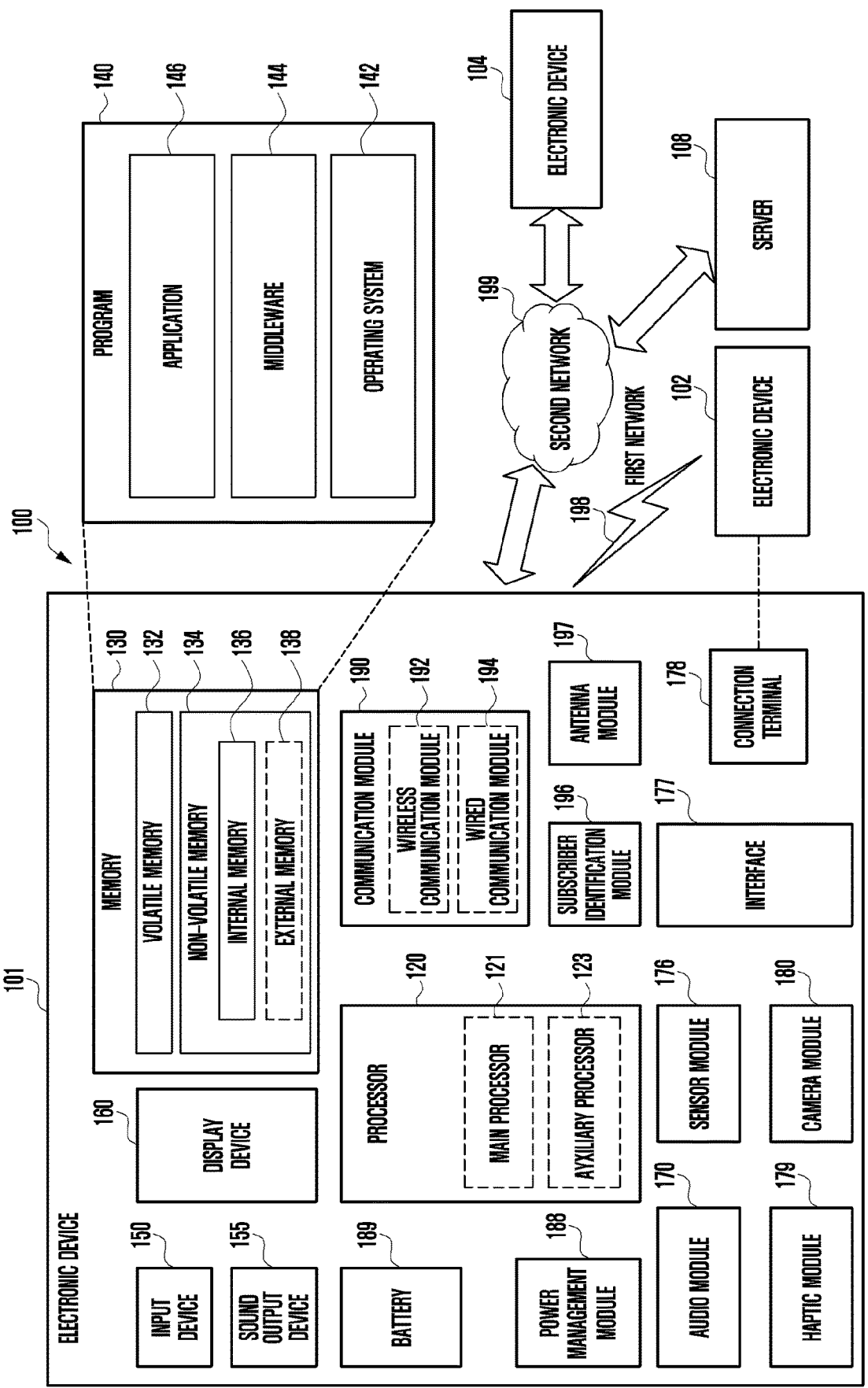
FIG. 1 illustrates a block diagram of an electronic device according to various embodiments.

FIG. 1 illustrates a block diagram of an electronic device 101 in a network environment 100 according to certain embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, or projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element implemented using a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
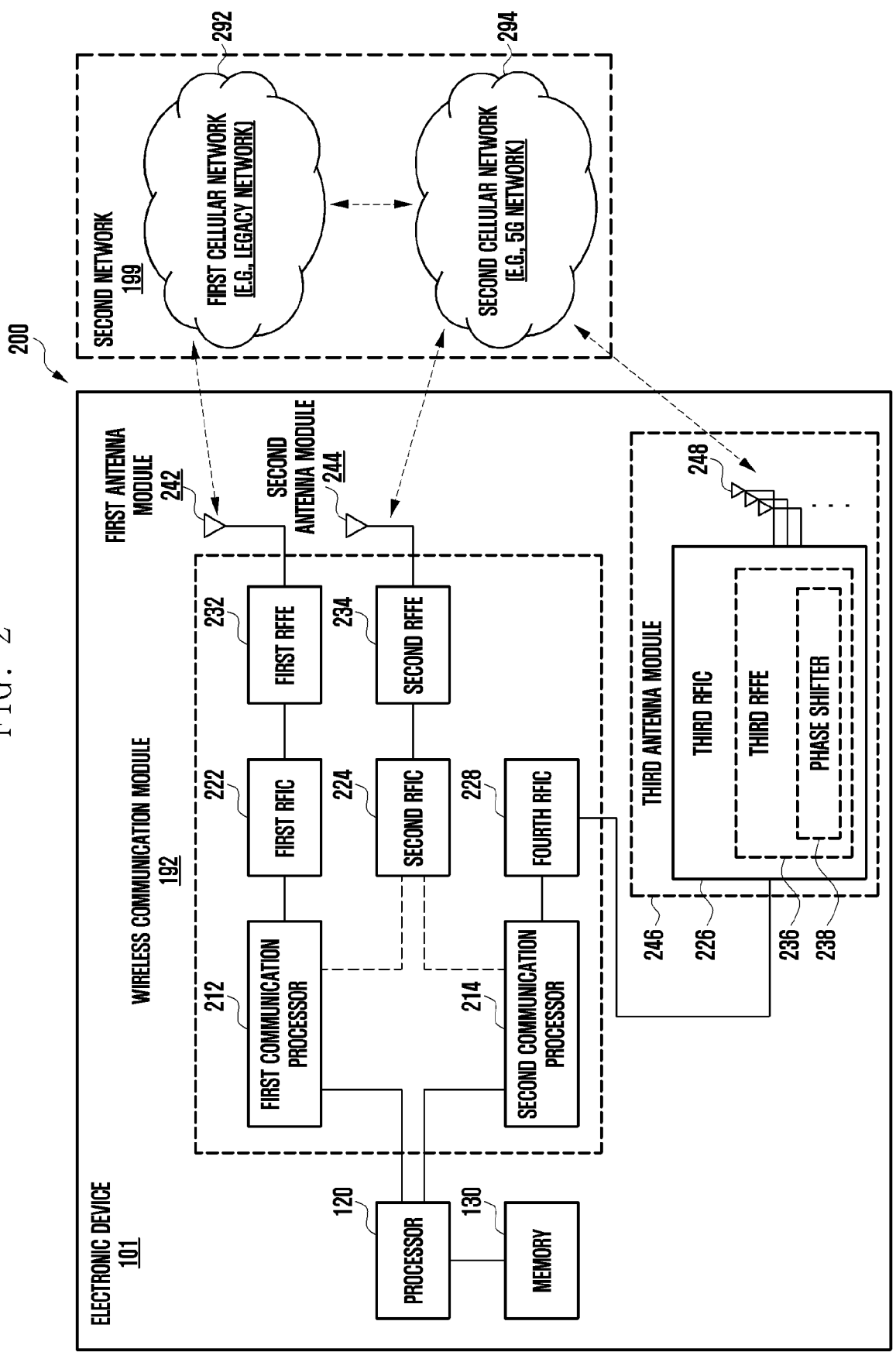
FIG. 2 illustrates a block diagram of an electronic device for supporting legacy network communication and 5G network communication according to various embodiments.

FIG. 2 illustrates a block diagram 200 of an electronic device 101 for supporting legacy network communication and 5G network communication according to certain embodiments. Referring to FIG. 2, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include the processor 120 and the memory 130. The network 199 may include a first network 292 and a second network 294. According to another embodiment, the electronic device 101 may further include at least one component among the components illustrated in FIG. 1, and the network 199 may further include at least one other network. According to an embodiment, the first communication processor 212, the second communication processor 214, the first RFIC 222, the second RFIC 224, the fourth RFIC 228, the first RFFE 232, and the second RFFE 234 may be included as at least a part of the wireless communication module 192. According to another embodiment, the fourth RFIC 228 may be omitted or may be included as a part of the third RFIC 226.

The first communication processor 212 may establish a communication channel of a band to be used for wireless communication with the first network 292, and may support legacy network communication via the established communication channel. According to certain embodiments, the first network may be a legacy network including 2G, 3G, 4G, or long term evolution (LTE) network. The second communication processor 214 may establish a communication channel corresponding to a designated band (e.g., approximately 6 GHz to 60 GHz) among bands to be used for wireless communication with the second network 294, and may support 5G network communication via the established channel. According to certain embodiments, the second network 294 may be a 5G network defined in 3GPP. Additionally, according to an embodiment, the first communication processor 212 or the second communication processor 214 may establish a communication channel corresponding to another designated band (e.g., lower than 6 GHz) among bands to be used for wireless communication with the second network 294, and may support 5G network communication via the established channel. According to an embodiment, the first communication processor 212 and the second communication processor 214 may be implemented in a single chip or a single package. According to certain embodiments, the first communication processor 212 or the second communication processor 214 may be implemented in a single chip or a single package, together with the processor 120, the sub-processor 123, or the communication module 190.

In the case of transmission, the first RFIC 222 may convert a baseband signal generated by the first communication processor 212 into a radio frequency (RF) signal in a range of approximately 700 MHz to 3 GHz used for the first network 292 (e.g., a legacy network). In the case of reception, an RF signal is obtained from the first network 292 (e.g., a legacy network) via an antenna (e.g., the first antenna module 242), and may be preprocessed via an RFFE (e.g., the first RFFE 232). The first RFIC 222 may convert the preprocessed RF signal to a baseband signal so that the base band signal is processed by the first communication processor 212.

In the case of transmission, the second RFIC 224 may convert a baseband signal generated by the first communication processor 212 or the second communication processor 214 into an RF signal (hereinafter, a 5G Sub6 RF signal) of a Sub6 band (e.g., lower than 6 GHz) used for the second network 294 (e.g., 5G network). In the case of reception, a 5G Sub6 RF signal is obtained from the second network 294 (e.g., a 5G network) via an antenna (e.g., the second antenna module 244), and may preprocessed by an RFFE (e.g., the second RFFE 234). The second RFIC 224 may convert the preprocessed 5G Sub6 RF signal into a baseband signal so that the baseband signal is processed by a corresponding communication processor from among the first communication processor 212 or the second communication processor 214.

The third RFIC 226 may convert a baseband signal generated by the second communication processor 214 into an RF signal (hereinafter, a 5G Above6 RF signal) of a 5G Above6 band (e.g., approximately 6 GHz to 60 GHz) to be used for the second network 294 (e.g., 5G network). In the case of reception, a 5G Above6 RF signal is obtained from the second network 294 (e.g., a 5G network) via an antenna (e.g., the antenna 248), and may be preprocessed by the third RFFE 236. The third RFIC 226 may convert the preprocessed 5G Above6 RF signal to a baseband signal so that the base band signal is processed by the second communication processor 214. According to an embodiment, the third RFFE 236 may be implemented as a part of the third RFIC 226.

According to an embodiment, the electronic device 101 may include the fourth RFIC 228, separately from or as a part of the third RFIC 226. In this instance, the fourth RFIC 228 may convert a baseband signal generated by the second communication processor 214 into an RF signal (hereinafter, an IF signal) in an intermediate frequency band (e.g., approximately 9 GHz to 11 GHz), and may transfer the IF signal to the third RFIC 226. The third RFIC 226 may convert the IF signal to a 5G Above6 RF signal. In the case of reception, a 5G Above6 RF signal is received from the second network 294 (e.g., a 5G network) via an antenna (e.g., the antenna 248), and may be converted into an IF signal by the third RFFE 226. The fourth RFIC 228 may convert the IF signal to a baseband signal so that the base band signal is processed by the second communication processor 214.

According to an embodiment, the first RFIC 222 and the second RFIC 224 may be implemented as a single chip or at least a part of the single package. According to an embodiment, the first RFFE 232 and the second RFFE 234 may be implemented as a single chip or at least a part of the single package. According to an embodiment, at least one antenna module of the first antenna module 242 or the second antenna module 244 may be omitted, or may be combined with another antenna module so as to process RF signals in a plurality of bands.

According to an embodiment, the third RFIC 226 and the antenna 248 may be disposed in the same substrate and may form the third antenna module 246. For example, the wireless communication module 192 or the processor 120 may be disposed in a first substrate (e.g., main PCB). In this instance, the third RFIC 226 is disposed in a part (e.g., a lower part) of the second substrate (e.g., a sub PCB) separate from the first substrate and the antenna 248 is disposed on another part (e.g., an upper part), so that the third antenna module 246 is formed. By disposing the third RFIC 226 and the antenna 248 in the same substrate, the length of a transmission line therebetween may be reduced. For example, this may reduce a loss (e.g., attenuation) of a signal in a high-frequency band (e.g., approximate 6 GHz to 60 GHz) used for 5G network communication, the loss being caused by a transmission line. Accordingly, the electronic device 101 may improve the quality or speed of communication with the second network 294 (e.g., 5G network).

According to an embodiment, the antenna 248 may be implemented as an antenna array including a plurality of antenna elements which may be used for beamforming. In this instance, the third RFIC 226 may be, for example, a part of the third RFFE 236, and may include a plurality of phase shifters 238 corresponding to a plurality of antenna elements. In the case of transmission, each of the plurality of phase shifters 238 may shift the phase of a 5G Above6RF signal to be transmitted to the outside of the electronic device 101 (e.g., a base station of a 5G network) via a corresponding antenna element. In the case of reception, each of the plurality of phase shifters 238 may shift the phase of the 5G Above6 RF signal received from the outside via a corresponding antenna element into the same or substantially the same phase. This may enable transmission or reception via beamforming between the electronic device 101 and the outside.

The second network 294 (e.g., 5G network) may operate independently (e.g., stand-along (SA)) from the first network 292 (e.g., a legacy network), or may operate by being connected thereto (e.g., non-stand alone (NSA)). For example, in the 5G network, only an access network (e.g., 5G radio access network (RAN) or next generation RAN (NG RAN)) may exist, and a core network (e.g., next generation core (NGC)) may not exist. In this instance, the electronic device 101 may access an access network of the 5G network, and may access an external network (e.g., the Internet) under the control of the core network (e.g., an evolved packed core (EPC)) of the legacy network. Protocol information (e.g., LTE protocol information) for communication with the legacy network or protocol information (e.g., new radio (NR) protocol information) for communication with the 5G network may be stored in the memory 230, and may be accessed by another component (e.g., the processor 120, the first communication processor 212, or the second communication processor 214).

Figure 3:
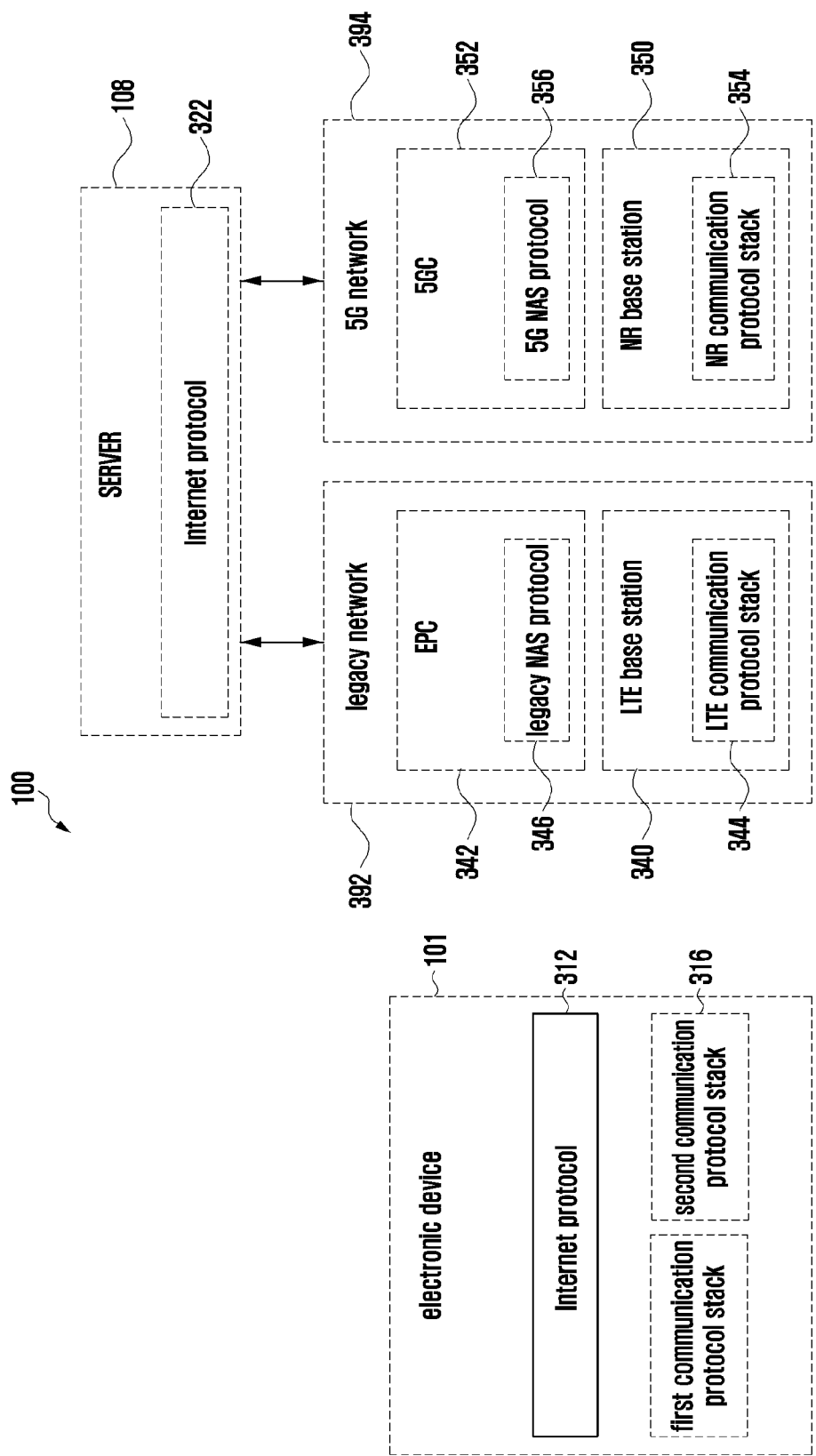
FIG. 3 illustrates a protocol stack structure of a network in legacy network communication and/or 5G network communication according to various embodiments.

FIG. 3 illustrates a protocol stack structure of the network 100 of legacy communication and/or 5G communication according to an embodiment.

Referring to FIG. 3, the network 100 according to an illustrated embodiment may include the electronic device 101, a legacy network 392, a 5G network 394, and the server 108.

The electronic device 101 may include an Internet protocol 312, a first communication protocol stack 314, and a second communication protocol stack 316. The electronic device 101 may communicate with the server 108 through the legacy network 392 and/or the 5G network 394.

According to an embodiment, the electronic device 101 may perform Interne communication associated with the server 108 through the Internet protocol 312 (for example, a TCP, a UDP, or an IP). The Internet protocol 312 may be executed by, for example, a main processor (for example, the main processor 121 of FIG. 1) included in the electronic device 101.

According to another embodiment, the electronic device 101 may perform wireless communication with the legacy network 392 through the first communication protocol stack 314. According to another embodiment, the electronic device 101 may perform wireless communication with the 5G network 394 through the second communication protocol stack 316. The first communication protocol stack 314 and the second communication protocol stack 316 may be executed by, for example, one or more communication processors (for example, the wireless communication module 192 of FIG. 1) included in the electronic device 101.

The server 108 may include an Internet protocol 322. The server 108 may transmit and receive data related to the Internet protocol 322 to and from the electronic device 101 through the legacy network 392 and/or the 5G network 394. According to an embodiment, the server 108 may include a cloud computing server existing outside the legacy network 392 or the 5G network 394. According to another embodiment, the server 108 may include an edge computing server (or a mobile edge computing (MEC) server) located inside at least one of the legacy network or the 5G network 394.

The legacy network 392 may include an LTE eNode B (eNB) 340 and an EPC 342. The LTE eNB 340 may include an LTE communication protocol stack 344. The EPC 342 may include a legacy NAS protocol 346. The legacy network 392 may perform LTE wireless communication with the electronic device 101 through the LTE communication protocol stack 344 and the legacy NAS protocol 346.

The 5G network 394 may include an NR gNB 350 and a 5GC 352. The NR gNB 350 may include an NR communication protocol stack 354. The 5GC 352 may include a 5G NAS protocol 356. The 5G network 394 may perform NR wireless communication with the electronic device 101 through the NR communication protocol stack 354 and the 5G NAS protocol 356.

According to an embodiment, the first communication protocol stack 314, the second communication protocol stack 316, the LTE communication protocol stack 344, and the NR communication protocol stack 354 may include a control plane protocol for transmitting and receiving a control message and a user plane protocol for transmitting and receiving user data. The control message may include a message related to at least one of, for example, security control, bearer setup, authentication, registration, or mobility management. The user data may include, for example, the remaining data except other than the control message.

According to an embodiment, the control plane protocol and the user plane protocol may include a physical (PHY) layer, a medium access control (MAC) layer, a radio link control (RLC) layer, or a packet data convergence protocol (PDCP) layer. The PHY layer may channel-code and modulate data received from, for example, a higher layer (for example, the MAC layer), transmit the data through a radio channel, demodulate and decode the data received through the radio channel, and transmit the data to the higher layer. The PHY layer included in the second communication protocol stack 316 and the NR communication protocol stack 354 may further perform an operation related to beamforming. The MAC layer may logically/physically map, for example, data to a radio channel for transmitting and receiving the data and perform a hybrid automatic repeat request (HARD) for error correction. The RLC layer may perform, for example, data concatenation, segmentation, or reassembly, and data sequence identification, reordering, or duplication detection. The PDCP layer may perform an operation related to, for example, ciphering of a control message and user data and data integrity. The second communication protocol stack 316 and the NR communication protocol stack 354 may further include a service data adaptation protocol (SDAP). The SDAP may manage allocation of radio bearers on the basis of quality of service (QoS) of user data.

According to certain embodiments, the control plane protocol may include a radio resource control (RRC) layer and a non-access stratum (NAS) layer. The RRC layer may process control, for example, data related to radio bearer setup, paging, or mobility management. The NAS may process, for example, a control message related to authentication, registration, or mobility management.

Figure 4A:
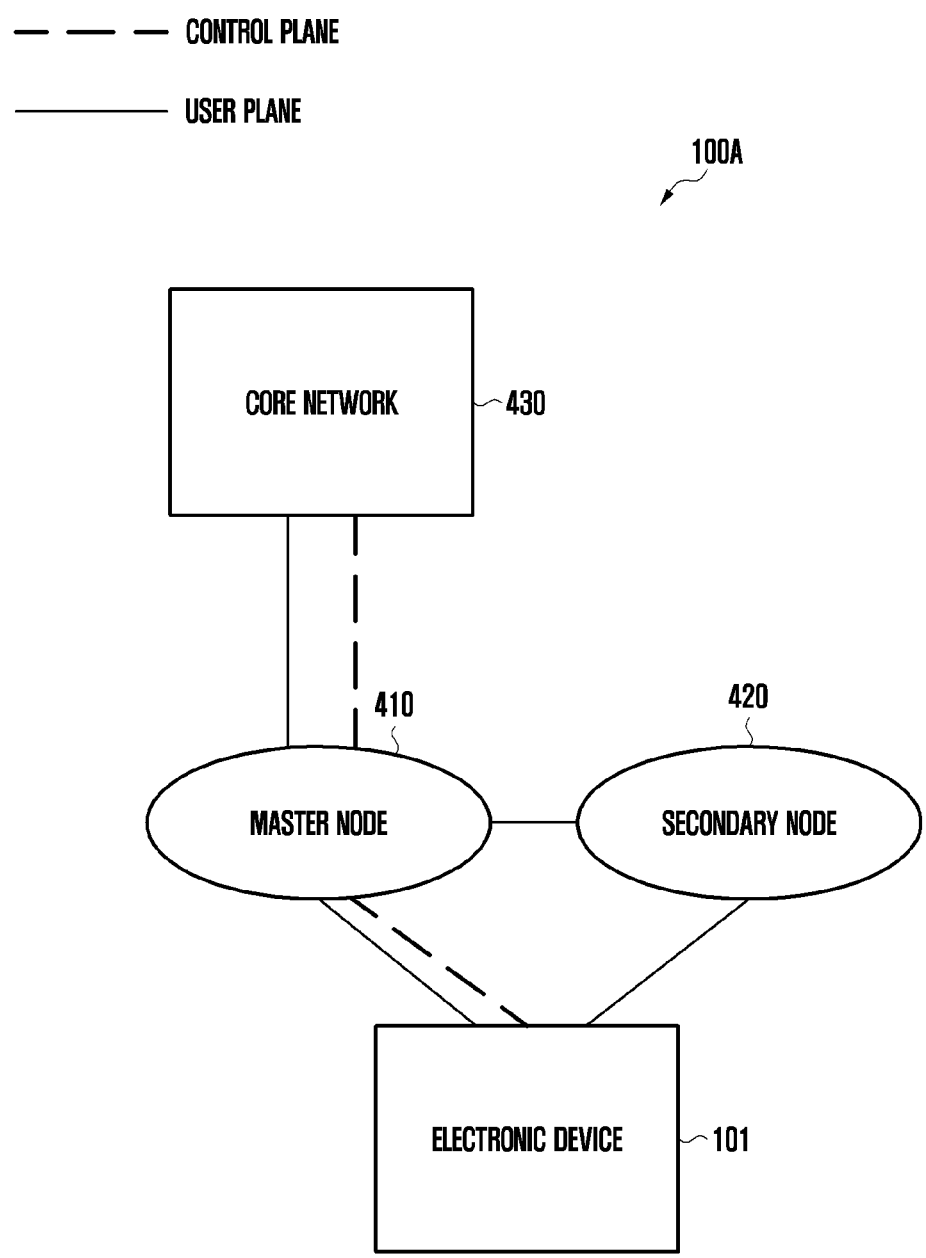
FIGS. 4A to 4C illustrate a wireless communication system for providing a network of legacy communication and 5G communication according to various embodiments.
Figure 4B:
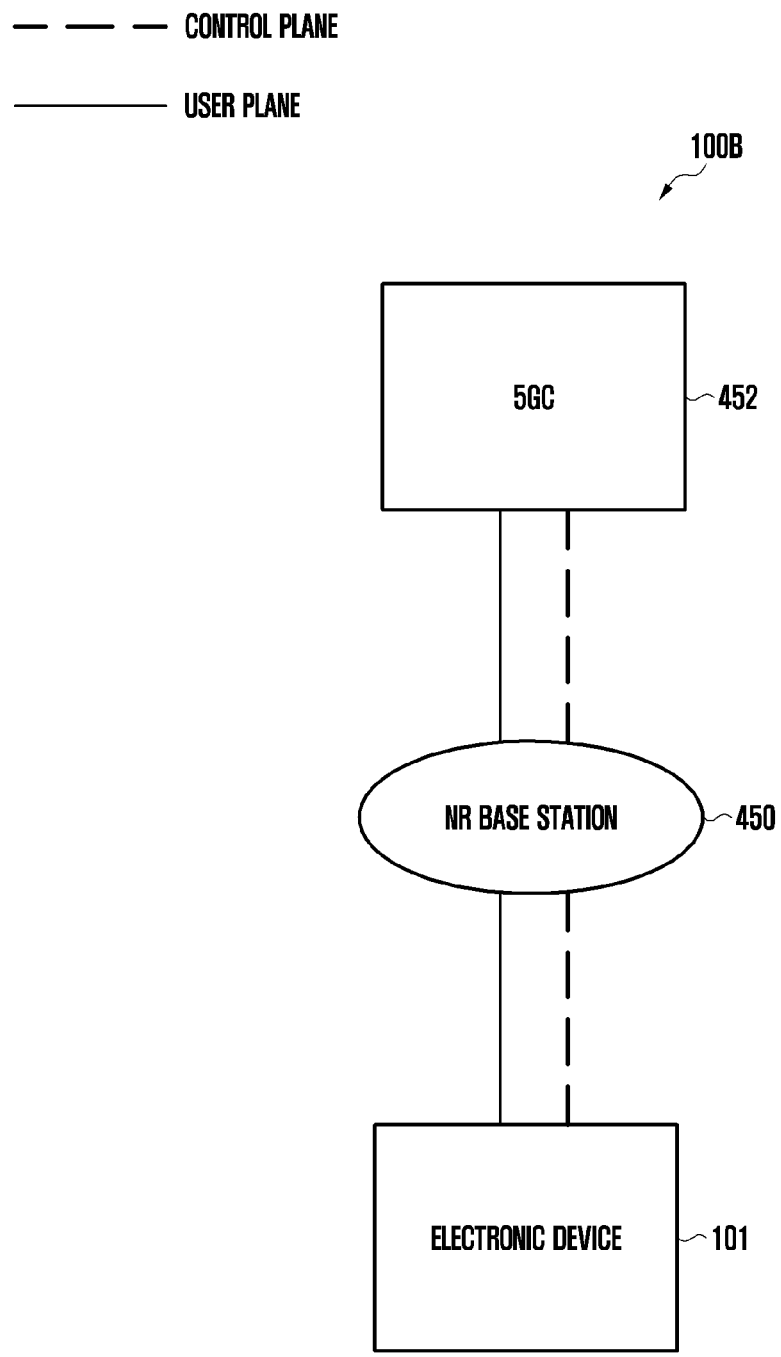
Figure 4C:
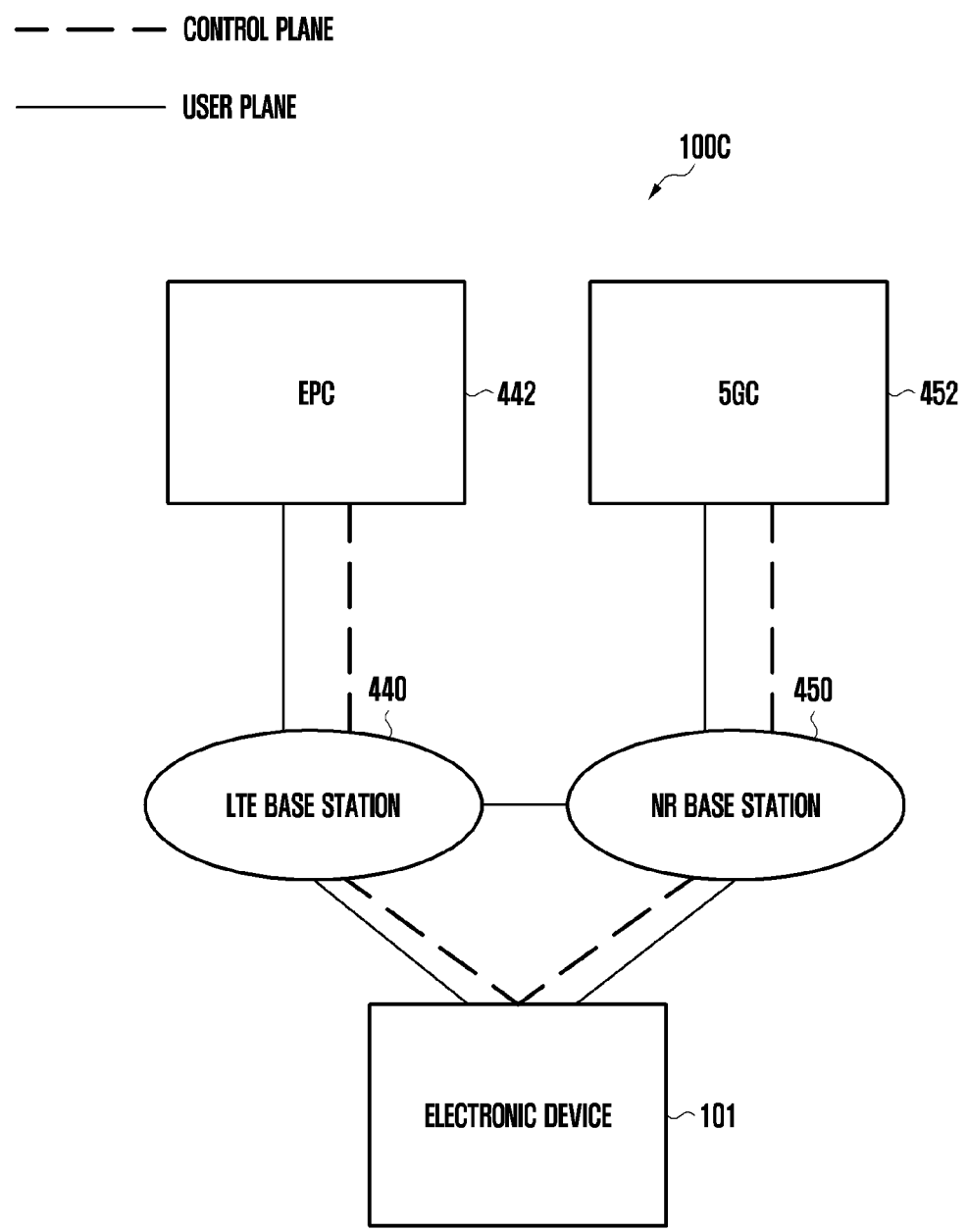

FIG. 4A illustrates a wireless communication system providing a network of legacy communication and/or 5G communication according to certain embodiments, FIG. 4B illustrates a wireless communication system providing a network of legacy communication and/or 5G communication according to certain embodiments, and FIG. 4C illustrates a wireless communication system providing a network of legacy communication and/or 5G communication according to certain embodiments. Referring to FIGS. 4A to 4C, network environments 100A to 100C may include at least one of a legacy network and a 5G network. The legacy network may include, for example, a 4G or LTE eNB 450 (for example, an eNodeB (eNB)) of the 3GPP standard supporting radio access with the electronic device 101 and an evolved packet core (EPC) 451 for managing 4G communication. The 5G network may include, for example, a new radio (NR) gNB 450 (for example, a gNodeB (gNB)) supporting radio access with the electronic device 101 and a 5th generation core (5GC) 452 for managing 5G communication of the electronic device 101.

According to certain embodiments, the electronic device 101 may transmit and receive a control message and user data through legacy communication and/or 5G communication. The control message may include, for example, a control message related to at least one of security control of the electronic device 101, bearer setup, authentication, registration, or mobility management. The user data may be, for example, user data other than a control message transmitted and received between the electronic device 101 and a core network 430 (for example, the EPC 442).

Referring to FIG. 4A, the electronic device 101 according to an embodiment may transmit and receive at least one of a control message or user data to and from at least some of the 5G network (for example, the NR gNB 450 and the 5GC 452) using at least some of the legacy network (for example, the LTE eNB 440 and the EPC 442).

According to certain embodiments, the network environment 100A may include a network environment for providing wireless communication dual connectivity (multi-radio access technology (RAT) dual connectivity (MR-DC)) to the LTE eNB 440 and the NR gNB 450 and transmitting and receiving a control message to and from the electronic device 101 through one core network 430 of the EPC 442 or the 5GC 452.

According to certain embodiments, one of the MR-DC environments, the LTE eNB 440 or the NR gNB 450 may operate as a master node (MN) 410, and the other may operate as a secondary node (SN) 420. The MN 410 may be connected to the core network 430 and transmit and receive a control message. The MN 410 and the SN 420 may be connected to each other through a network interface and transmit and receive a message related to radio resource (for example, communication channel) management.

According to certain embodiments, the MN 410 may include the LTE eNB 450, the SN 420 may include the NR gNB 450, and the core network 430 may include the EPC 442. For example, a control message may be transmitted and received through the LTE eNB 440 and the EPC 442, and user data may be transmitted and received through the LTE eNB 450 and the NR gNB 450.

Referring to FIG. 4B, according to certain embodiments, the 5G network may independently transmit and receive a control message and user data to and from the electronic device 101.

Referring to FIG. 4C, the legacy network and the 5G network according to certain embodiments may independently provide data transmission and reception. For example, the electronic device 101 and the EPC 442 may transmit and receive a control message and user data through the LTE eNB 450. According to another embodiment, the electronic device 101 and the 5GC 452 may transmit and receive a control message and user data through the NR gNB 450.

According to certain embodiments, the electronic device 101 may be registered in at least one of the EPC 442 or the 5GC 450 and transmit and receive a control message.

According to certain embodiments, the EPC 442 or the 5GC 452 may interwork and manage communication of the electronic device 101. For example, movement information of the electronic device 101 may be transmitted and received through an interface between the EPC 442 and the 5GC 452.

Figure 5:
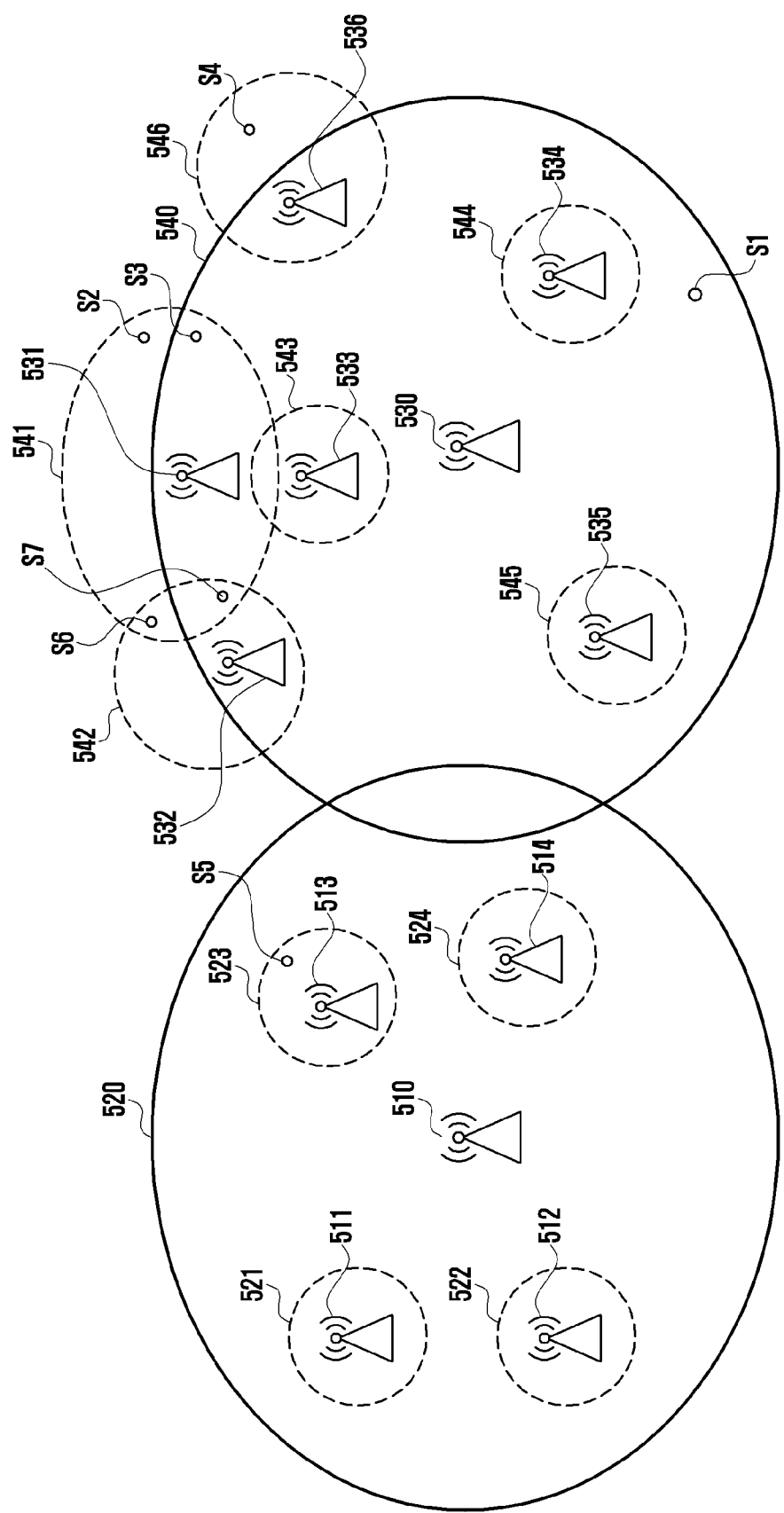
FIG. 5 illustrates a node supporting first cellular communication, a node supporting EN-DC, and a node supporting second cellular communication.

FIG. 5 illustrates a node supporting first cellular communication, a node supporting EN-DC, and a node supporting second cellular communication.

An electronic device (e.g., the electronic device 101 in FIG. 1) according to various embodiments may transmit or receive data to or from various external electronic devices through first cellular communication or second cellular communication via a node (e.g., the master node 410 in FIG. 4A, the secondary node 420 in FIG. 4A, the NR base station 450 in FIG. 4B, the LTE base station 440 in FIG. 4C, or the NR base station 450 in FIG. 4C) 510, 511, 512, 513, 514, 530, 531, 532, 533, 534, 535, or 536. The first cellular communication may refer to one of various cellular communication types which can be supported by the electronic device 101. For example, the first cellular communication may be one of 4G mobile communication types (e.g., long-term evolution (LTE), LTE-advanced (LTE-A), LTE advanced pro (LTE-A pro)), and may refer to, for example, communication on the first cellular network in FIG. 2. The second cellular communication is one of various cellular communication types which can be supported by the electronic device 101, and may refer to, for example, communication on the second cellular network 294 in FIG. 2. For example, the second cellular communication may be one of 5G mobile communication schemes (e.g., 5G on below 6 GHz or 5G on above 6 GHz).

According to various embodiments, the second cellular communication may be a more recent-generation communication standard than the first cellular communication. The second cellular communication may implement data exchange using a higher frequency band than the first cellular communication and may implement a higher data transfer rate than the first cellular communication.

According to various embodiments, at least some nodes 510 and 530 among the nodes 510, 511, 512, 513, 514, 530, 531, 532, 533, 534, 535, and 536 may transmit or receive data to or from the electronic device 101 through the first cellular communication.

According to various embodiments, at least some nodes 511, 512, 513, 514, 531, 532, 533, 534, and 535 among the nodes 510, 511, 512, 513, 514, 530, 531, 532, 533, 534, 535, and 536 may transmit or receive data to or from the electronic device 101 through the second cellular communication.

According to various embodiments, the first cellular communication may use a lower frequency band than the second cellular communication (e.g., the first cellular communication may use a frequency of 2 GHz or lower, and the second cellular communication may use a frequency of 2 GHz or higher), and thus may implement wider cell coverage than the second cellular communication. Referring to FIG. 5, cells 520 and 540, which are implemented by the nodes 510 and 530 supporting first cellular communication, have wider coverages than cells 521, 522, 523, 524, 541, 542, 543, 544, 545, and 546, which are implemented by the nodes 511, 512, 513, 514, 531, 532, 533, 534, 535, and 536 supporting second cellular communication.

According to various embodiments, at least some nodes 531 among the nodes 511, 512, 513, 514, 531, 532, 533, 534, 535, and 536 supporting the second cellular communication may support data communication using a low frequency band (e.g., a frequency band of 6 GHz or lower, sub-6G), compared with the other nodes 511, 512, 513, 514, 532, 533, 534, 535, and 536. According to various embodiments, the node 531 may be a node supporting E-UTRA-NR-dual-connectivity (EN-DC). EN-DC may refer to a communication scheme for connecting the node 530 supporting the first cellular communication to the node 531 supporting the second cellular communication so as to transmit or receive data. The node 531 may support data communication using a relatively low frequency band, compared with the other nodes 511, 512, 513, 514, 532, 533, 534, 535, and 536, and thus may implement a cell that is wider than the cells 521, 522, 523, 524, 542, 543, 544, 545, and 546 which are implemented by the other nodes 511, 512, 513, 514, 532, 533, 534, 535, and 536.

According to various embodiments, nodes, the coverages of which at least partially overlap each other, among the nodes 510, 511, 512, 513, 514, 530, 531, 532, 533, 534, 535, and 536, may be defined as "adjacent nodes." According to one embodiment, the node 510 supporting the first cellular communication and the nodes 511, 512, 513, and 514 supporting the second cellular communication may be adjacent nodes. The node 530 supporting the first cellular communication and the nodes 532, 533, 534, 535, and 536 supporting the second cellular communication may be adjacent nodes. The node 530 supporting the first cellular communication and the node 531 supporting DC may be adjacent nodes.

According to various embodiments, in order to exchange data with external electronic devices via the nodes 510, 511, 512, 513, 514, 530, 531, 532, 533, 534, 535, and 536, the electronic device 101 may select (or reselect) a node with which to establish a communication connection from among the nodes 510, 511, 512, 513, 514, 530, 531, 532, 533, 534, 535, and 536, based on the intensity of a signal which is broadcast by the node, and may preferentially perform registration (or re-registration) with the selected node.

According to various embodiments, for quick registration, the electronic device 101 may select the node with which to establish a communication connection, by using cellularcommunication-related information included in a database stored in a memory (e.g., the memory 130 in FIG. 1).

According to a comparative example to be compared with an embodiment, when the database does not include any information on a node existing in a region in which the electronic device 101 is positioned (e.g., when the electronic device 101 has moved from another region to the region illustrated in FIG. 5), the electronic device 101 may search for a node which broadcasts a signal through a frequency band supported by the electronic device 101. After the passage of a time (e.g., 40 seconds) necessary to search all frequency bands supported by the electronic device 101, the electronic device 101 may select a node to be registered and may perform a registration procedure with the selected node. The increased time taken for the electronic device 101 to search all frequency bands may deteriorate the communication performance of the electronic device 101. Furthermore, even in the situation in which the electronic device 101 can be registered in (or can camp on) a node supporting a relatively high data communication speed, a phenomenon in which the electronic device 101 is registered in another node may occur. Table 1 described below shows the situation that may occur in each of regions (S1 to S7) in which the electronic device 101 according to the comparative example is positioned.

TABLE 1

| Region | Within coverage of second cellular communication? | With in coverage supporting EN-DC? | Within coverage of first cellular communication? | Node capable of implementing optimal data communication performance | Situations that may arise |
| --- | --- | --- | --- | --- | --- |
| S1 | N | N | Y | Node 530 supporting first cellular communication | It may take a long time to select a node to be registered. |
| S2 | N | Y | N | Node 531 supporting EN-DC | It may take a long time to select a node to be registered. |
| S3 | N | Y | Y | Node 531 supporting EN-DC | It may take a long time to select a node to be registered. It is possible to be first connected to the node 530 supporting first cellular communication. |
| S4 | Y | N | N | Node 536 supporting second cellular communication | It may take a long time to select a node to be registered. |
| S5 | Y | N | Y | Node 513 supporting second cellular communication | It may take a long time to select a node to be registered. It is possible to be first connected to the node 510 supporting first cellular communication. |
| S6 | Y | Y | N | Node 532 supporting second cellular communication | It may take a long time to select a node to be registered. It is possible to be first connected to the node 532 supporting EN-DC. |

TABLE 1-continued

| Region | Within coverage of second cellular communication? | With in coverage supporting EN-DC? | Within coverage of first cellular communication? | Node capable of implementing optimal data communication performance | Situations that may arise |
|---|---|---|---|---|---|
| S7 | Y | Y | Y | Node 532 supporting second cellular communication | It may take a long time to select a node to be registered. It is possible to be first connected to the node 530 supporting first cellular communication or the node 531 supporting EN-DC. |

Hereinafter, a description will be made of an embodiment in which the electronic device 101 may quickly search for a node in view of the phenomenon described above, and may perform registration with a node capable of implementing an optimal data communication speed within a region in which the electronic device 101 is positioned.

Figure 6:
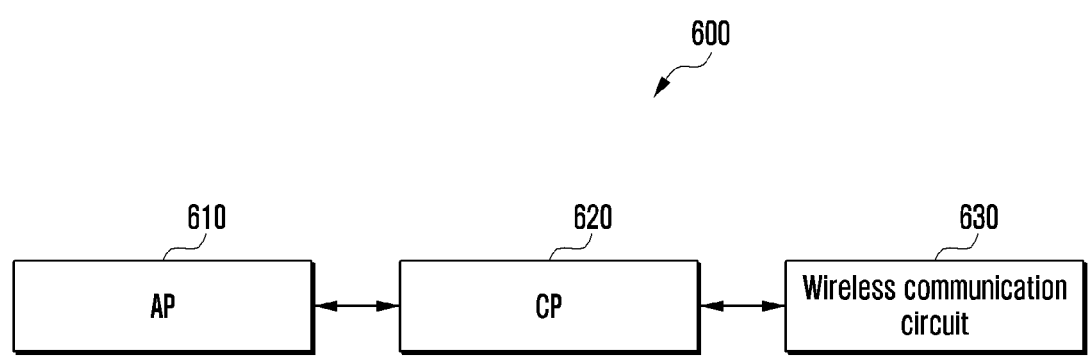
FIG. 6 illustrates a block diagram of an electronic device according to various embodiments.

FIG. 6 illustrates a block diagram of an electronic device according to various embodiments.

Referring to FIG. 6, an electronic device (e.g., the electronic device 101 in FIG. 1) 600 according to various embodiments may include: an application processor (AP) (e.g., the processor 120 in FIG. 1) 610; a communication processor (CP) (e.g., the first communication processor 212 or the second communication processor 214 in FIG. 2) 620; and a wireless communication circuit 630.

According to various embodiments, the application processor 610 may process data which the communication processor 620 has received through first cellular communication or second cellular communication. In order to transmit the data to an external electronic device, the application processor 610 may transmit user data to the communication processor 620 or may control the communication processor 620. According to one embodiment, in the situation in which the electronic device 600 switches from an airplane mode or a service restriction mode to a normal mode by turning-on the electronic device 600 or in a radio resource control (RRC) idle mode, the application processor 610 may control the communication processor 620 such that the communication processor 620 searches for a node to be registered (e.g., searches a public land mobile network (PLMN)) and registers with the found node.

According to various embodiments, the wireless communication circuit 630 may include various circuit structures which are used to modulate and/or demodulate a signal in the electronic device 600. For example, the wireless communication circuit 630 may modulate a baseband signal to a radio frequency (RF) band signal so as to be output via an antenna, or may demodulate an RF band signal received via the antenna to a baseband signal, and may transmit the modulated or demodulated signal to the processor 620. The wireless communication circuit 630 may include various RFICs (e.g., the first RFIC 222, the second RFIC 224, the third RFIC 226, and the fourth RFIC 228 in FIG. 2) and/or RF front end modules (e.g., the first RFFE 232, the second RFFE 234, and the third RFFE 236 in FIG. 2). All of the elements of the wireless communication circuit 630 may be included in the same chip, or some thereof may be included in different chips. According to various embodiments, at least two among the application processor 610, the communication processor 620, and the wireless communication circuit 630 may be included in the same chip.

According to various embodiments, in response to reception of a signal which requests PLMN searching (or requests searching for a node to be registered) and is transmitted by the application processor 610, the communication processor 620 may search for a node to be registered, based on a database stored in a memory (e.g., the memory 130 in FIG. 1). According to various embodiments, in response to reception of a signal which requests PLMN registration and is transmitted by the application processor 610, the communication processor 620 may search for a node to be registered, based on the database stored in the memory (e.g., the memory 130 in FIG. 1). The database may include information on a node previously connected to the electronic device 101. For example, the database may include identification information of at least one previously connected node and the frequency band of a signal transmitted by the node. The communication processor 620 may search for a node to be registered, based on the node-related information included in the database.

According to various embodiments, the communication processor 620 may fail to find a node to be registered, based on previously stored database. The failure to find a node to be registered may include failure to find a node by using information (a frequency band of the node or an identifier of the node) included in the database. According to one embodiment, when the previously stored database does not include information on a node existing in a region in which the electronic device 600 is positioned, the communication processor 620 may fail to find a node based on the database. For example, when the electronic device 600 is positioned in a region in which the electronic device 600 has never visited (e.g., when roaming), the database may not include information on nodes existing in the region in which the electronic device 600 is positioned.

According to various embodiments, in response to the failure to find a node based on the previously stored database, the communication processor 620 may update the database or generate a new database, and may search for the node to be registered, based on information on nodes stored in the updated or newly generated database. Hereinafter, an embodiment in which a database is updated or newly generated will be described.

According to various embodiments, the communication processor 620 may receive, via the wireless communication circuit 630, a signal transmitted through some frequency bands among frequency bands of the first cellular communication supported by the electronic device 600. According to one embodiment, the communication processor 620 may search the database for a frequency band corresponding to at least some PLMNs of a country in which the electronic device 600 is positioned, and may receive a signal transmitted by a node in the found frequency band. According to one embodiment, information on the frequency band corresponding to the at least some PLMNs of the country in which the electronic device 600 is positioned may be stored in a memory (e.g., a memory disposed in the communication processor 620 or the memory 130 in FIG. 1) of the electronic device 600. The information on the frequency band corresponding to the at least some PLMNs of the country in which the electronic device 600 is positioned may be stored during the manufacture of the electronic device 600, and may be received from a server (e.g., the server 108 in FIG. 1) operated by the manufacturer of the electronic device 600 or the provider of the communication service that is used by the electronic device 600. According to one embodiment, the information on the frequency band corresponding to the at least some PLMNs of the country may be received from the server 108 via a network (the second network 199 in FIG. 1) and stored in the memory 130. A node may periodically broadcast system information of a cell implemented thereby such that the electronic device 600 present within the cell can access the node. The node may broadcast a signal including the system information (system information block (SIB)) via the first cellular communication.

According to various embodiments, the system information may include first system information including information on whether a node (e.g., the node 530 in FIG. 5) supports DC for a terminal positioned within the coverage of the node 530. The DC may refer to a connection method of simultaneously using resources controlled by one or more nodes. According to one embodiment, the DC may be E-UTRA-NR dual connectivity (EN-DC) or NR-NR dual connectivity (NR-DC). The first system information may include SIB 2 defined in 3GPP TS 36.331 v15.6. SIB 2 may include information necessary for access by the electronic device 600 to a node. For example, SIB 2 may include information on an uplink cell bandwidth, a random access parameter, or a parameter related to uplink power control. SIB 2 may include information (e.g. upperLayerIndication-r15) indicating an upper layer of the first cellular communication. According to various embodiments, the information indicating the upper layer of the first cellular communication may include information indicating whether the electronic device 600 supporting second cellular communication is included in the coverage of the second cellular communication. According to various embodiments, the information indicating the upper layer of the first cellular communication may include information indicating that the electronic device 600 supporting the second cellular communication can establish a second cellular communication connection via a node which transmits the information indicating the upper layer.

According to various embodiments, the system information may include second system information including information on a node (e.g. the nodes 532, 533, 534, 535, or 536 in FIG. 5) which supports the second cellular communication at the periphery of the coverage of a node (e.g. the node 530 in FIG. 5)). The node which supports the second cellular communication and is included in the second system information may be a node supporting a standalone (SA) mode of the second cellular communication. The second system information may include SIB 24 defined in 3GPP TS 36.331 v15.6. SIB 24 may include the identifier of the node supporting the second cellular communication, a frequency band used by the node, or physical identification information of the node (PCI).

According to various embodiments, in order to receive the first system information and the second system information, the communication processor 620 may receive third system information transmitted through some frequency bands among frequency bands of the first cellular communication supported by the electronic device 600. The communication processor 620 may search for a node to which to connect while using first cellular communication via a frequency band corresponding to at least some PLMNs of the first cellular communication of a country in which the electronic device 600 is positioned, and may receive the third system information from a found node. The third system information may include information about the provider of the node transmitting the third system information or information that is used for cell access. The third system information may include SIB 1 defined in 3GPP TS 36.331 v15.6. The communication processor 620 may receive the system information and the second system information, based on scheduling information which is related to broadcasting of another SIB (e.g., SIB 2 or SIB 24) included in the third system information. On the basis of the scheduling information related to broadcasting of another SIB (e.g., SIB 2 or SIB 24) included in SIB 1, the communication processor 620 may receive SIB 2 or SIB 24.

According to various embodiments, the communication processor 620 may receive the first system information and the second system information from at least one node. The communication processor 620 may generate a database or update a previously generated database, based on the first system information and the second system information. The communication processor 620 may generate or update a database including: information including whether a node supports DC; and information indicating whether a node supporting the second cellular communication is positioned around a node which broadcasts the first system information and the second system information.

According to various embodiments, the database may include at least one among a frequency band of first cellular communication supported by at least one node, PLMN information, cell identification information, a frequency band of second cellular communication supported by another node (e.g., a node supporting a standalone mode) adjacent to the at least one node, or identification information of the another node adjacent to the at least one node. According to one embodiment, the database may be implemented in the form shown in Table 2.

TABLE 2

| Index | Frequency band | PLMN ID | Node identification information | Whether EN-DC is supported | Information on adjacent node supporting second cellular communication |
|---|---|---|---|---|---|
| 1 | Frequency band A | PLMN A | Cell ID 1 | Y or N | Frequency + Identification information |
| 2 | Frequency band B | PLMN B | Cell ID 2 | Y or N | Frequency + Identification information |
| 3 | Frequency band C | PLMN C | Cell ID 3 | Y or N | Frequency + Identification information |

According to various embodiments, the database may include information regarding: whether each node included in the database supports DC; and a neighboring node supporting an SA mode. The communication processor 620 may determine the searching order of at least one node included in the database, based on information on nodes stored in the database.

According to various embodiments, the communication processor 620 may determine a priority based on a cellular communication type supported by at least one node included in the database. The communication processor 620 may determine the searching order of the at least one node based on the priority. According to one embodiment, the communication processor 620 may search for a node having a relatively high priority before searching for a node having a relatively low priority. According to one embodiment, the communication processor 620 may determine the priority, based on the database, such that a node supporting second cellular communication has a higher priority than a node supporting DC. According to one embodiment, the communication processor 620 may determine the priority, based on the database, such that a node supporting second cellular communication has a higher priority than a first cellular communication node supporting DC. According to one embodiment, the communication processor 620 may determine the priority such that a node supporting DC has a higher priority than a node supporting first cellular communication. According to one embodiment, the communication processor 620 may determine the priority such that a node supporting DC has a higher priority than a node which does not support DC. For example, the communication processor 620 may determine, based on the database, a priority in order of a node supporting an SA mode of second cellular communication, a first cellular communication node supporting a DC mode, and a node which supports first cellular communication but does not support a DC mode.

According to various embodiments, the priority can be variously modified. For example, the electronic device 600 may receive user input designating a specific cellular communication type through a display (e.g., the display device 160 in FIG. 1). The communication processor 620 may give a higher priority to a node supporting a cellular communication type selected by a user (e.g., first cellular communication) than to a node supporting another cellular communication type (e.g., second cellular communication).

According to various embodiments, even when the communication processor 620 receives a signal requesting PLMN searching (or a signal requesting a search for a node to be registered) from the application processor 610, the communication processor 620 may put a PLMN searching process on hold until the database is generated or updated. When the generation or updating of the database is completed, the communication processor 620 may search for a node to be registered.

According to various embodiments, even when the communication processor 620 receives a signal requesting PLMN registration from the application processor 610, the communication processor 620 may put a PLMN searching operation for a PLMN registration process on hold until the database is generated or updated. When the generation or updating of the database is completed, the communication processor 620 may search for a node to be registered.

According to various embodiments, the communication processor 620 may search for a node to be registered, based on the determined searching order. The communication processor 620 may determine whether to perform a procedure for registration of a selected node, based on the intensity of a signal transmitted by the selected node. According to one embodiment, when it is determined that the intensity of the signal transmitted by the selected node is equal to or greater than a preconfigured value, the communication processor 620 may determine to perform the procedure for registration of the selected node. The registration procedure between the electronic device 600 and the node to be registered may include various procedures including: the mutual authentication procedure between the electronic device 600 and a core network (e.g., the core network in FIG. 4A, the 5GC 452 in FIG. 4B, or the EPC 442 in FIG. 4C) connected to the selected node; and the mutual authentication procedure between the selected node and the electronic device 600.

According to various embodiments, when it is determined that searching for the node to be registered based on the generated or updated database is unsuccessful, the communication processor 620 may search for a node that broadcasts a signal through all frequency bands supported by the electronic device 600. According to one embodiment, the communication processor 620 may start to search for a node beginning with a low frequency band among the frequency bands supported by the electronic device 600. A node supporting data communication via a low frequency band (e.g., first cellular communication) may have wider cell coverage than a node supporting data communication via a relatively high frequency band (e.g., second cellular communication), and thus may perform faster cell searching.

According to various embodiments, the communication processor 620 may generate or update a database, based on the first system information and/or the second system information, broadcast by a node positioned near the electronic device 600, and may search for a node to be registered, based on the database. The electronic device 600 is capable of performing node searching more quickly than in the case of the comparative example of searching for a node to be registered by using all frequency bands supported by the electronic device 600. Further, the communication processor 620 may determine a node-searching order based on a cellular communication type stored in the database and may perform node searching in the determined searching order.

By performing node searching regardless of the searching order, the electronic device 600 may implement a data communication speed faster than that in a comparative example in which the electronic device 600 is connected to a node other than a node that can implement the faster data communication speed.

Figure 7:
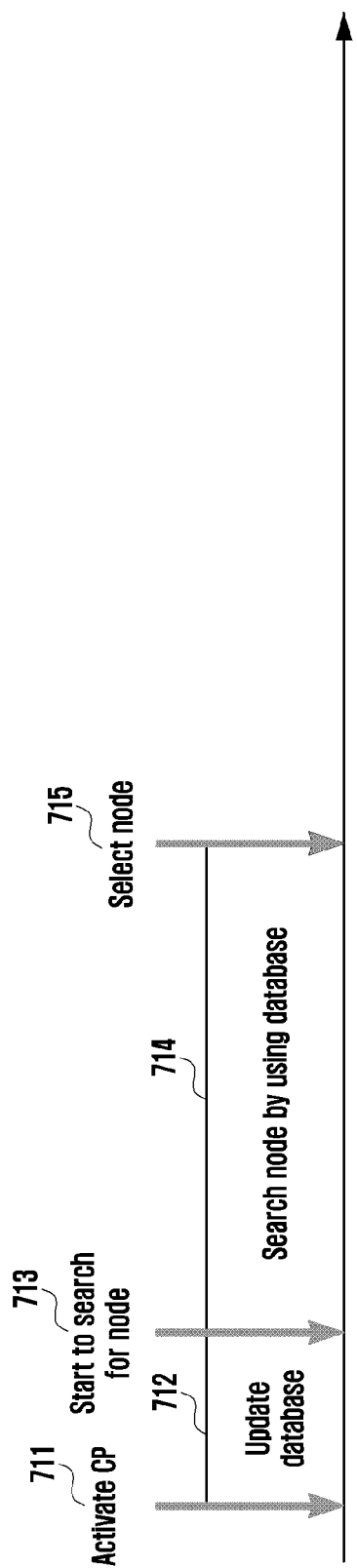
FIG. 7 illustrates the time required for node searching by an electronic device according to various embodiments.

FIG. 7 illustrates the time required for node searching by an electronic device according to various embodiments.

For the sake of convenience of a description of FIG. 7, it is assumed that the electronic device 101 in FIG. 1 is an electronic device to which the embodiment illustrated in FIG. 6 is not applied, and that the electronic device 600 in FIG. 6 is an electronic device to which the embodiment illustrated in FIG. 6 is applied.

According to various embodiments, the electronic device 600 may be positioned in S1 or S2 of FIG. 5. A communication processor (e.g., the communication processor 620 in FIG. 6) of the electronic device 600 may be activated (operation 711) to update a database (operation 712).

According to various embodiments, the communication processor 620 may control a wireless communication circuit (e.g., the wireless communication circuit 630 in FIG. 6) to receive first system information or second system information, based on third system information which is broadcast by a node positioned near the electronic device 600. On the basis of the first system information or the second system information, the communication processor 620 may generate a database or may update a previously generated database. The communication processor 620 may generate or update a database including: information including whether a node supports DC; and information on a neighboring node supporting second cellular communication.

According to various embodiments, the communication processor 620 may start node searching (operation 713) and may perform node searching based on the database (operation 714). The communication processor 620 may select a node to be registered (e.g., the node 530 in FIG. 5 when the electronic device 600 is positioned in S1, or the node 531 in FIG. 5 when the electronic device 600 is positioned in S2).

When a comparative example, in which searching for a node to be registered is performed using all frequency bands supported by the electronic device 101, is compared with an embodiment in which the electronic device 600 performs node searching using the database generated based on the first system information or the second system information, the electronic device 600 does not perform node searching supporting second cellular communication (determines that the database does not include information on a node supporting the second cellular communication) in the embodiment, and thus can perform node searching more quickly than in the comparative example.

According to various embodiments, the electronic device 600 may be positioned in S3 of FIG. 5. A communication processor (e.g., the communication processor 620 in FIG. 6) of the electronic device 600 may be activated (operation 711) to update a database (operation 712).

According to various embodiments, the communication processor 620 may control a wireless communication circuit (e.g., the wireless communication circuit 630 in FIG. 6) to receive first system information or second system information, based on third system information which is broadcast by a node positioned near the electronic device 600. On the basis of the first system information or the second system information, the communication processor 620 may generate a database or may update a previously generated database. The communication processor 620 may generate or update a database including: information including whether a node supports DC; and information on a neighboring node supporting second cellular communication.

According to various embodiments, the communication processor 620 may start node searching (operation 713) and may perform node searching based on the database (operation 714).

According to various embodiments, the communication processor 620 may perform node searching based on a searching order determined based on the cellular communication type that is supported by each node stored in the database. For example, the communication processor 620 may search for the first cellular communication node 531 supporting DC before searching for the first cellular communication node 530 which does not support DC.

When a comparative example, in which searching for a node to be registered is performed without considering the searching order determined based on the cellular communication type, is compared with an embodiment in which searching for a node to be registered is performed in consideration of the searching order determined based on the cellular communication type, the electronic device 600 may search for the first cellular communication node 531 supporting DC before searching for the first cellular communication node 530 which does not support DC, and thus may perform registration with the node 531 which supports a data transfer rate higher than that in the comparative example.

According to various embodiments, the electronic device 600 may be positioned in S4 of FIG. 5. A communication processor (e.g., the communication processor 620 in FIG. 6) of the electronic device 600 may be activated (operation 711) to update a database (operation 712).

According to various embodiments, the communication processor 620 may control a wireless communication circuit (e.g., the wireless communication circuit 630 in FIG. 6) to receive first system information or second system information, based on third system information which is broadcast by a node positioned near the electronic device 600. On the basis of the first system information or the second system information, the communication processor 620 may generate a database or may update a previously generated database. The communication processor 620 may generate or update a database including: information including whether a node supports DC; and information on a neighboring node supporting second cellular communication.

According to various embodiments, the communication processor 620 may start node searching (operation 713) and may perform node searching based on the database (operation 714). The communication processor 620 may select a node to be registered (e.g., the node 513 in FIG. 5 when the electronic device 600 is positioned in S5).

When a comparative example, in which searching for a node to be registered is performed using all frequency bands supported by the electronic device 101, is compared with an embodiment in which the electronic device 600 performs node searching using the database generated based on the first system information or the second system information, the electronic device 600 may not perform searching with respect to all frequency bands supported by the electronic device 600, but may search for only a node included in the second system information, and thus is capable of performing node searching faster than in the comparative example.

According to various embodiments, the electronic device 600 may be positioned in S5, S6, or S7 of FIG. 5. A communication processor (e.g., the communication processor 620 in FIG. 6) of the electronic device 600 may be activated (operation 711) to update a database (operation 712).

According to various embodiments, the communication processor 620 may control a wireless communication circuit (e.g., the wireless communication circuit 630 in FIG. 6) to receive first system information or second system information, based on third system information which is broadcast by a node positioned near the electronic device 600. On the basis of the first system information or the second system information, the communication processor 620 may generate a database or may update a previously generated database. The communication processor 620 may generate or update a database including: information including whether a node supports DC; and information indicating whether second cellular communication is supported.

According to various embodiments, the communication processor 620 may start node searching (operation 713) and may perform node searching based on the database (operation 714).

According to various embodiments, the communication processor 620 may perform node searching based on a searching order determined based on a cellular communication type which is supported by each node stored in the database. For example, the communication processor 620 may search for the node 531 supporting DC before searching for the node 530 supporting first cellular communication.

When a comparative example, in which searching for a node to be registered is performed without considering the searching order determined based on the cellular communication type, is compared with an embodiment in which searching for a node to be registered is performed in consideration of the searching order determined based on the cellular communication type, the electronic device 600 may search for the node 513 supporting DC before searching for the node 510 supporting first cellular communication, or may search for the node 532 supporting second cellular communication before searching for the node 531 supporting DC or the node 530 supporting first cellular communication, whereby the electronic device 600 may perform registration with a node supporting a data transfer rate higher than that in the comparative example (e.g., the node 513 when the electronic device 101 is positioned in S5, the node 532 when the electronic device 101 is positioned in S6, or the node 532 when the electronic device 101 is positioned in S7).

An electronic device according to various embodiments may include: at least one communication processor; and an application processor, wherein the at least one communication processor is configured to: receive first system information, including information on whether at least one node supporting first cellular communication supports dual connectivity (DC), or second system information, including information on a node which is adjacent to the at least one node and supports second cellular communication, from the at least one node via the first cellular communication; update, based on the first system information or the second system information, a database which includes information indicating whether the at least one node supports the DC and information indicating whether the node adjacent to the at least one node supports the second cellular communication; determine, based on the updated database, a searching order of at least one node included in the updated database; and search for a node to be registered, based on the determined searching order.

In the electronic device according to various embodiments, the at least one communication processor may be configured to: determine a priority based on a cellular communication type supported by the at least one node included in the updated database; and determine a searching order based on the determined priority.

In the electronic device according to various embodiments, the priority may be determined such that a node supporting the second cellular communication has a higher priority than a node supporting the DC, and a node supporting the EN-DC has a higher priority than a node supporting the first cellular communication.

In the electronic device according to various embodiments, the at least one communication processor may be configured to: receive a signal requesting searching for the node to be registered from the application processor; in response to the received signal, put the searching for the node to be registered on hold until the updating of the database is completed; and search for the node to be registered when the updating of the database is completed.

In the electronic device according to various embodiments, the at least one communication processor may be configured to, in response to determining that the electronic device fails to find the node to be registered based on a database including information on a previously registered node, update the database based on the first system information and the second system information.

In the electronic device according to various embodiments, the at least one communication processor may be configured to: identify a country in which the electronic device is positioned; and receive the first system information or the second system information, which is broadcast using a representative frequency band of first cellular communication of the country.

In the electronic device according to various embodiments, the at least one communication processor may be configured to, in response to determination of failure to find a node to be registered based on the updated database, search for a node supporting first cellular communication in all frequency bands supported by the at least one communication processor.

In the electronic device according to various embodiments, the at least one communication processor may be configured to search for the node beginning with a low frequency band among all frequency bands.

In the electronic device according to various embodiments, the first system information may include a system information block (SIB) 2, which includes information indicating an upper layer of the first cellular communication, and the at least one communication processor may be configured to identify whether the node supports DC, based on the information indicating the upper layer of the first cellular communication.

In the electronic device according to various embodiments, the second system information may include an SIB 24, and the at least one communication processor may be configured to identify, based on the second system information, information on the node supporting the second cellular communication.

In the electronic device according to various embodiments, the database may include at least one among a frequency band of the first cellular communication supported by the at least one node, public land mobile network (PLMN) information of the at least one node, identification information of a cell corresponding to the at least one node, a frequency band of the second cellular communication supported by another node adjacent to the at least one node, and physical identification information of the another node adjacent to the at least one node.

Figure 8:
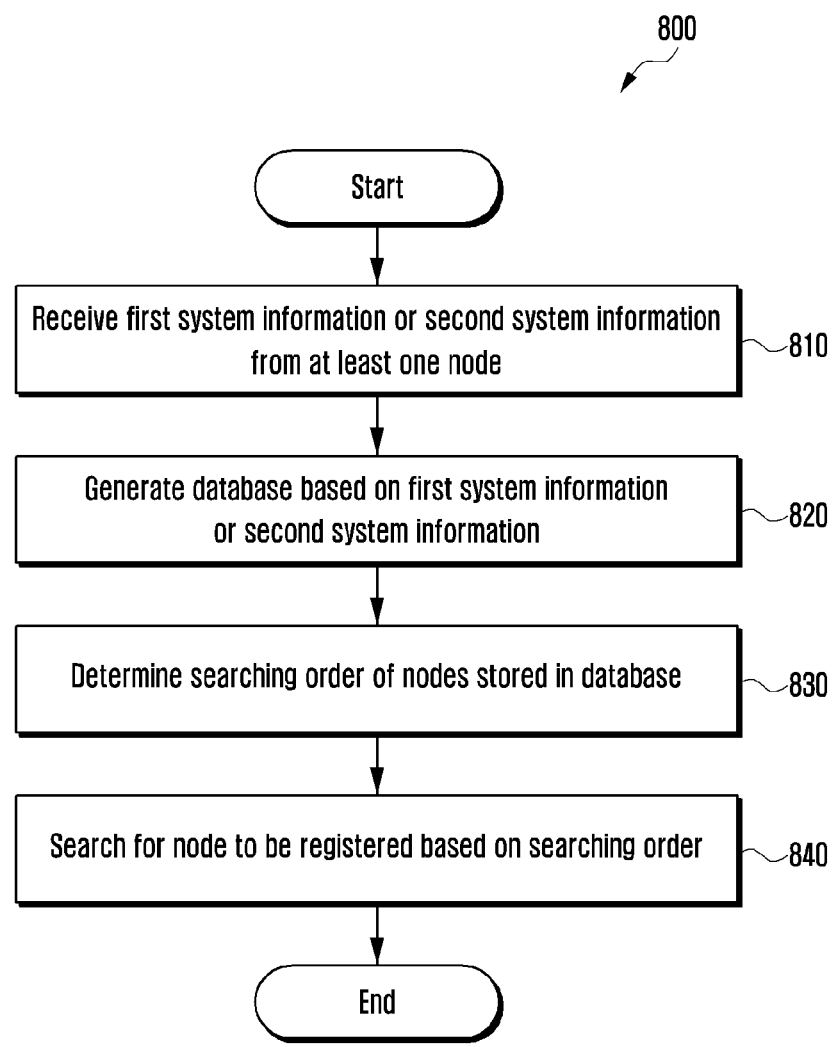
FIG. 8 illustrates a flowchart of an operation method of an electronic device according to various embodiments.

FIG. 8 illustrates a flowchart of an operation method 800 of an electronic device according to various embodiments.

According to various embodiments, in operation 810, a communication processor (e.g., the communication processor 620 in FIG. 6) of the electronic device (e.g., the electronic device 600 in FIG. 6) may receive at least one of first system information or second system information from at least one node (e.g., the node 510, 511, 512, 513, 514, 530, 531, 532, 533, 534, 535, or 536 in FIG. 5).

According to various embodiments, the first system information may include information on whether a node (e.g., the node 530 in FIG. 5) supports DC. The DC may refer to a connection method of simultaneously using resources controlled by one or more nodes. According to one embodiment, the DC may be E-UTRA-NR dual connectivity (EN-DC) or NR-NR dual connectivity (NR-DC). The first system information may include SIB 2 defined in 3GPP TS 36.331 v15.6. SIB 2 may include information necessary for access by the electronic device 600 to a node. For example, SIB 2 may include information on an uplink cell bandwidth, a random access parameter, or a parameter related to uplink power control. SIB 2 may include information (e.g., upperLayer-Indication-r15) indicating an upper layer of first cellular communication. The information indicating the upper layer of the first cellular communication may include information indicating whether the electronic device 600 is included in the coverage of second cellular communication. According to various embodiments, the information indicating the upper layer of the first cellular communication may include information indicating that the electronic device 600 supporting the second cellular communication can perform a second cellular communication connection via a node that transmitted the information indicating the upper layer.

According to various embodiments, the second system information may include information on a node (e.g., the nodes 532, 533, 534, 535, or 536 in FIG. 5) which supports the second cellular communication at the periphery of the coverage of a node (e.g., the node 530 in FIG. 5). The node which supports the second cellular communication and is included in the second system information may be a node supporting a standalone (SA) mode of the second cellular communication. The second system information may include SIB 24 defined in 3GPP TS 36.331 v15.6. SIB 24 may include an identifier of the node supporting the second cellular communication, a frequency band used by the node, or physical identification information of the node (PCI).

According to various embodiments, in operation 820, the communication processor 620 may generate or update a database, based on the first system information or the second system information.

According to various embodiments, the database may include: information including whether a node included in the database supports DC; and information indicating whether the node supports the second cellular communication.

According to various embodiments, in operation 830, the communication processor 620 may determine the searching order of nodes stored in the database.

According to various embodiments, the communication processor 620 may determine a priority based on a cellular communication type supported by at least one node included in the database. The communication processor 620 may determine a searching order of the at least one node, based on the priority. According to one embodiment, the communication processor 620 may search for a node having a relatively high priority before searching for a node having a relatively low priority. According to one embodiment, the communication processor 620 may determine the priority such that a node supporting second cellular communication has a higher priority than a node supporting first cellular communication. According to one embodiment, the communication processor 620 may determine the priority such that a node supporting second cellular communication has a higher priority than a node supporting DC. The communication processor 620 may determine the priority such that a node supporting DC has a higher priority than a node supporting first cellular communication. The communication processor 620 may determine the priority such that a node supporting DC has a higher priority than a node that does not support DC. For example, the communication processor 620 may determine the priority in order of a node supporting an SA mode of second cellular communication, a first cellular communication node supporting a DC mode, and a node which supports first cellular communication but does not support a DC mode.

According to various embodiments, in operation 840, the communication processor 620 may search for a node to be registered, based on the searching order.

According to various embodiments, the registration procedure between the electronic device 600 and the node to be registered may include various procedures including: a mutual authentication procedure between the electronic device 600 and a core network (e.g., the core network in FIG. 4A, the 5GC 452 in FIG. 4B, or the EPC 442 in FIG. 4C) connected to a selected node.

Figure 9:
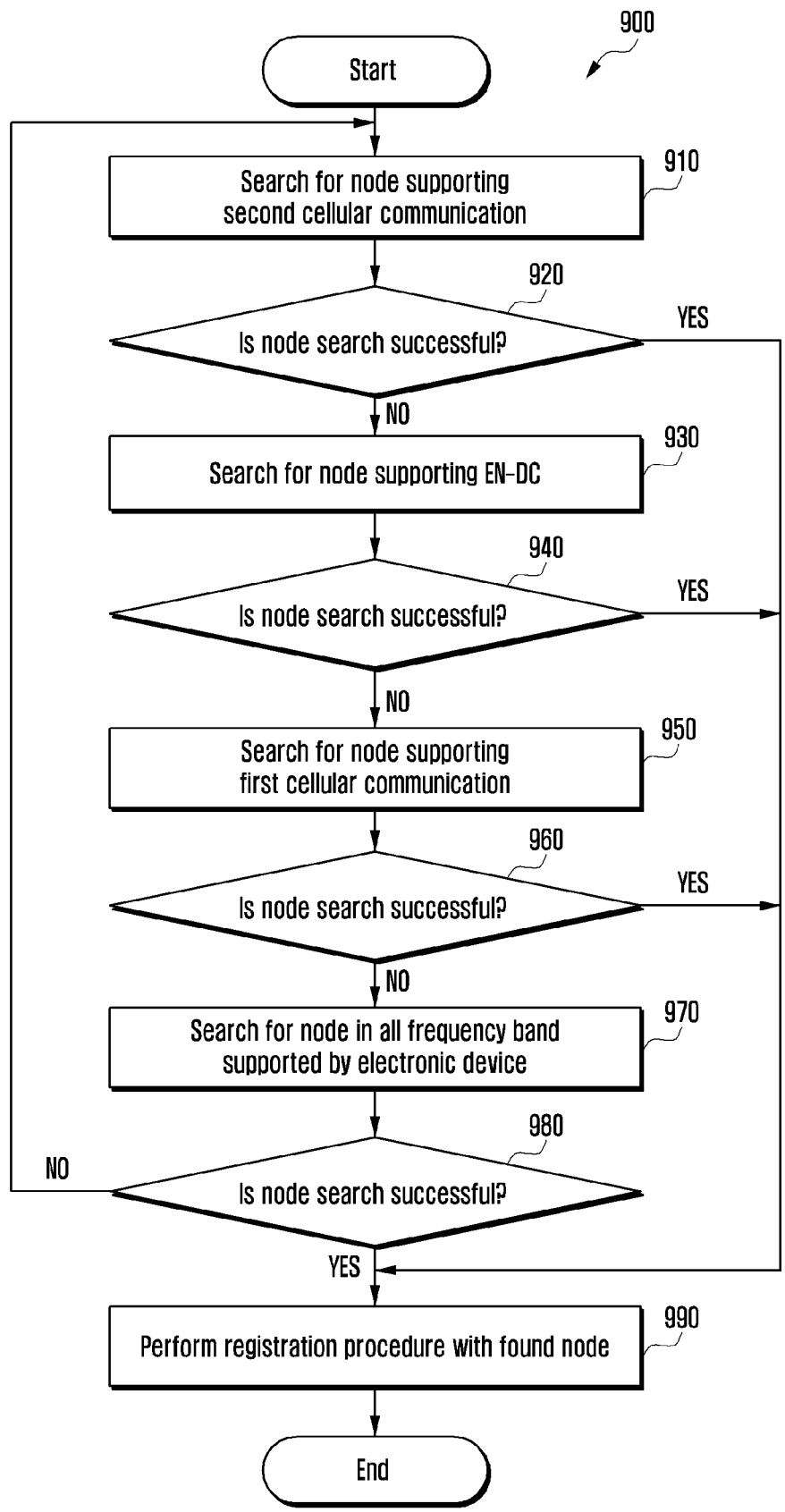
FIG. 9 illustrates a flowchart of a method for performing node searching based on a priority in an operation method of an electronic device according to various embodiments.

FIG. 9 illustrates a flowchart of a method for performing node searching based on a priority in an operation method of an electronic device according to various embodiments.

According to various embodiments, in operation 910, a communication processor (e.g., the communication processor 620 in FIG. 6) of the electronic device (e.g., the electronic device 600 in FIG. 6) may search for a node that supports second cellular communication among nodes stored in a database.

According to various embodiments, in operation 920, the communication processor 620 may determine whether the communication processor 620 has succeeded in finding the node supporting the second cellular communication. When the node search is successful (YES in operation 920), the communication processor 620 may perform a procedure for registration of a found node in operation 990.

According to various embodiments, in operation 930, in response to failure to find the node (NO in operation 920), the communication processor 620 may search for a node supporting DC among the nodes stored in the database.

According to various embodiments, in operation 940, the communication processor 620 may determine whether the communication processor 620 has succeeded in finding the node supporting DC. When the node search is successful (YES in operation 940), the communication processor 620 may perform a procedure for registration of the found node in operation 990.

According to various embodiments, in operation 950, the communication processor 620 may search for a first cellular communication node, which does not support DC, in response to failure to find the node (NO in operation 940).

According to various embodiments, in operation 960, the communication processor 620 may determine whether the communication processor 620 has succeeded in finding the node supporting first cellular communication. When the node search is successful (YES in operation 960), the communication processor 620 may perform a procedure for registration of the found node in operation 990.

According to various embodiments, in operation 970, the communication processor 620 may search for a node in all frequency bands supported by the electronic device 600, in response to failure to find the node (NO in operation 960).

According to various embodiments, the communication processor 620 may start to search for a node beginning with a low frequency band among the frequency bands supported by the electronic device 600. A node supporting data communication via a low frequency band (e.g., first cellular communication) may have wider cell coverage than a node supporting data communication via a relatively high frequency band (e.g., second cellular communication), and thus may perform faster cell searching.

According to various embodiments, in operation 980, the communication processor 620 may determine whether the communication processor 620 has succeeded in finding a node supporting the first cellular communication.

According to various embodiments, when the node search is successful (YES in operation 920, YES in operation 940, YES in operation 960, or YES in operation 980), the communication processor 620 may perform a procedure for registration of the found node in operation 990.

In the embodiment illustrated in operations 910 to 990, the electronic device 600 may determine a priority according to a cellular communication type supported by at least one node included in the database, and may determine a searching order based on the determined priority. For example, the communication processor 620 may determine a searching order in the order of a node supporting second cellular communication, a node supporting DC, and a node supporting first cellular communication. The electronic device 600 may determine the searching order based on the cellular communication type, as described above, and thus may prevent the electronic device 600 from being connected to a node other than a node capable of implementing a relatively high data transfer rate and may thereby implement a high data transfer rate.

Figure 10:
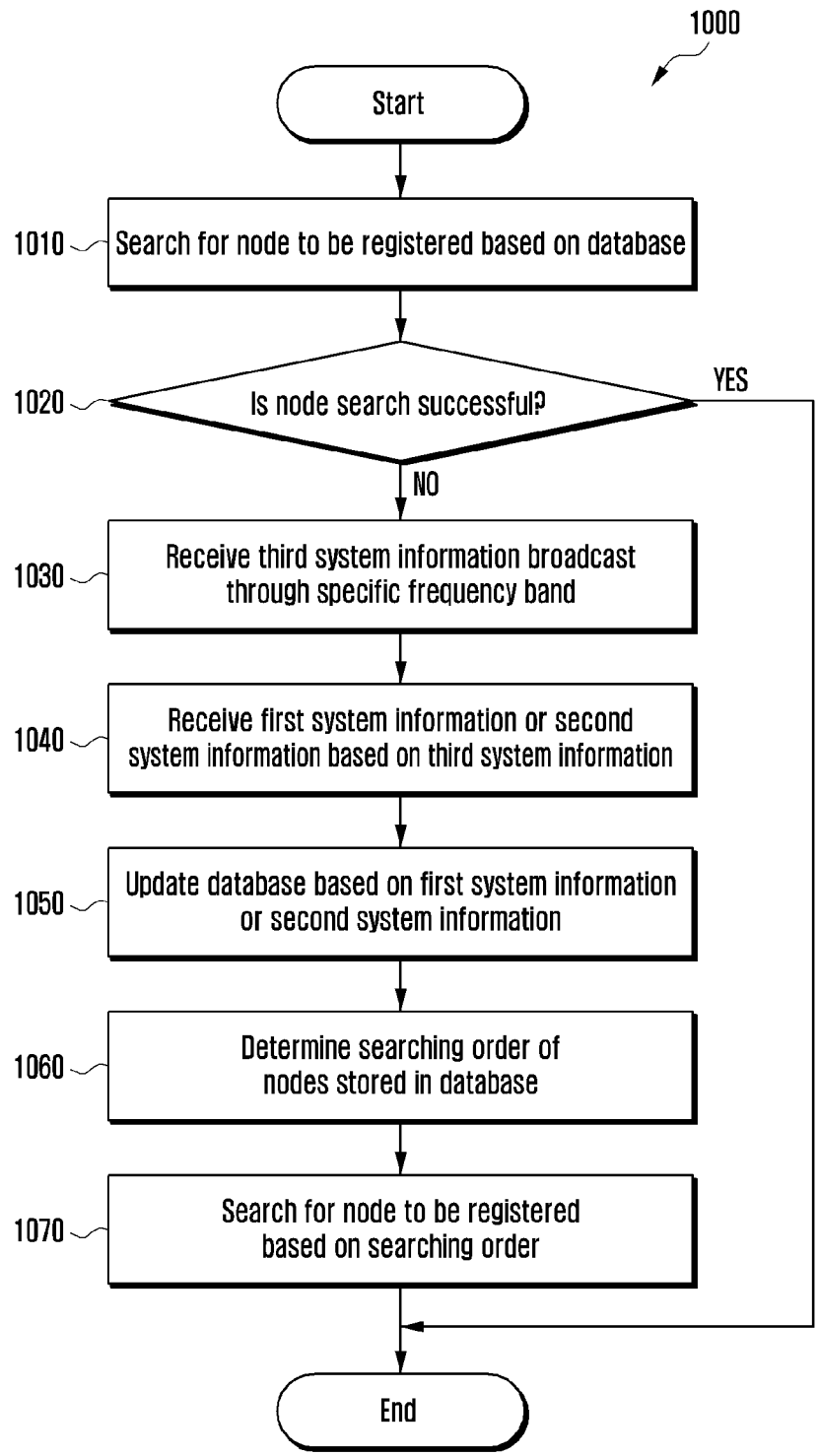
FIG. 10 illustrates a flowchart of an operation method of an electronic device according to various embodiments.

FIG. 10 illustrates a flowchart of an operation method 1000 of an electronic device according to various embodiments.

According to various embodiments, in operation 1010, a communication processor (e.g., the communication processor 620 in FIG. 6) of the electronic device (e.g., the electronic device 600 in FIG. 6) may search for a node to be registered, based on a database stored in a memory.

According to various embodiments, in operation 1020, the communication processor 620 may determine whether searching for the node to be registered is successful. When searching for the node to be registered is determined to be successful (operation 1020—YES), the communication processor 620 may perform a registration procedure with the node to be registered.

According to various embodiments, when searching for the node to be registered is determined to be unsuccessful (operation 1020—NO), the communication processor 620 may receive, in operation 1030, third system information which is broadcast through a specific frequency band.

According to various embodiments, the communication processor 620 may search the database for a frequency band corresponding to at least one PLMN of a country in which the electronic device 600 is positioned, and may use the found frequency band to receive the third system information transmitted by a node.

According to various embodiments, in operation 1040, the communication processor 620 may receive first system information or second system information, based on the third system information.

According to various embodiments, the third system information may include: provider information of the node transmitting the third system information; and information used at the time of cell access. The third system information may include SIB 1 that is defined in 3GPP TS 36.331 v15.6. The communication processor 620 may receive the first system information or the second system information, based on scheduling information related to broadcasting of another SIB (e.g., SIB 2 or SIB 24) included in SIB 1.

According to various embodiments, in operation 1050, the communication processor 620 may update the database, based on the first system information and the second system information.

According to various embodiments, the database may include: information including whether a node included in the database supports DC; and information indicating whether second cellular communication is supported.

According to various embodiments, in operation 1060, the communication processor 620 may determine a searching order of nodes stored in the database.

According to various embodiments, the communication processor 620 may determine a priority based on a cellular communication type supported by at least one node included in the database. The communication processor 620 may determine the searching order of the at least one node based on the priority. According to one embodiment, the communication processor 620 may search for a node having a relatively high priority before searching for a node having a relatively low priority. According to one embodiment, the communication processor 620 may determine the priority such that a node supporting second cellular communication has a higher priority than a node supporting DC. The communication processor 620 may determine the priority such that a node supporting DC has a higher priority than a node supporting first cellular communication. For example, the communication processor 620 may determine a priority in order of a node supporting an SA mode of second cellular communication, a node supporting a DC mode, and a node supporting first cellular communication.

According to various embodiments, in operation 1070, the communication processor 620 may search for the node to be registered, based on the determined searching order.

An operation method of an electronic device according to various embodiments may include: receiving first system information, including information on whether at least one node supporting first cellular communication supports dual connectivity (DC), or second system information, including information on a node which is adjacent to the at least one node and supports second cellular communication, from the at least one node via the first cellular communication; updating, based on the first system information or the second system information, a database which includes information indicating whether the at least one node supports the DC and information indicating whether the node adjacent to the at least one node supports the second cellular communication; determining, based on the updated database, a searching order of at least one node included in the updated database; and searching for a node to be registered, based on the determined searching order.

In the operation method of the electronic device according to various embodiments, the determining of the searching order may include: determining a priority based on a cellular communication type supported by the at least one node included in the updated database; and determining a searching order based on the determined priority.

In the operation method of the electronic device according to various embodiments, the priority may be determined such that a node supporting the second cellular communication has a higher priority than a node supporting the DC, and a node supporting the DC has a higher priority than a node supporting the first cellular communication.

The operation method of the electronic device according to various embodiments may further include: receiving a signal requesting the searching for the node to be registered from the application processor; in response to the received signal, putting the searching for the node to be registered on hold until the updating of the database is completed; and searching for the node to be registered when the updating of the database is completed.

The operation method of the electronic device according to various embodiments may further include: before receiving the first system information or the second system information, determining that the electronic device fails to find the node to be registered, based on a database including information on previously registered nodes; and updating the database, based on the first system information and the second system information, in response to the determination of failure to find the node to be registered.

In the operation method of the electronic device according to various embodiments, the receiving of the first system information and the second system information may include: identifying a country in which the electronic device is positioned; and receiving the first system information or the second system information, which is broadcast using a representative frequency band of first cellular communication of the country.

The operation method of the electronic device according to various embodiments may further include, in response to determination of failure to find the node to be registered based on the updated database, searching for a node supporting first cellular communication in all frequency bands supported by the at least one communication processor.

In the operation method of the electronic device according to various embodiments, the searching for the node supporting the first cellular communication may include searching for the node beginning with a lower frequency band among all frequency bands.

In the operation method of the electronic device according to various embodiments, the first system information may include a system information block (SIB) 2 which includes information indicating an upper layer of the first cellular communication, and the second system information may include an SIB 24. The operation method of the electronic device may further include: identifying whether the node supports DC, based on the information indicating the upper layer of the first cellular communication; and identifying, based on the second system information, information on a node supporting the second cellular communication.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively." as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
at least one communication processor; and
an application processor operably connected to the at least one communication processor, wherein the at least one communication processor is configured to:
receive, from at least one node via a first cellular communication, at least one of a first system information comprising a first information that indicates whether the at least one node supporting the first cellular communication supports dual connectivity (DC) or a second system information comprising a second information for an adjacent node that is adjacent to the at least one node and supports a standalone mode of a second cellular communication;
before receiving the at least one of the first system information or the second system information, store a database comprising information for previously registered nodes, wherein the information for the previously registered nodes includes, for each respective previously registered node included in the database:
a third information indicating whether the respective previously registered node supports dual connectivity (DC), and
a fourth information indicating whether an adjacent node that is adjacent to the respective previously registered node supports the standalone mode of the second cellular communication;
update, based on the received at least one of the first system information and the second system information, the database to comprise the first information and the second information in addition to the third information and the fourth information;
determine, based on the updated database, a searching order of one or more nodes included in the updated database, wherein the searching order is determined to search the adjacent at least one node supporting the standalone mode of the second cellular communication prior to other nodes; and
search a node to be registered based on the determined searching order,
wherein the at least one communication processor is further configured to:
in response to determining, when the at least one communication processor is activated, that the at least one communication processor fails to search the node to be registered based on the database, update the database based on at least one of the first system information and the second system information before receiving, from the application processor, a signal requesting searching for the node to be registered.

2. The electronic device of claim 1, wherein the at least one communication processor is configured to:
determine a priority based on a cellular communication type supported by the at least one node included in the updated database; and
determine the searching order based on the determined priority.

3. The electronic device of claim 2, wherein the priority is determined such that a second node supporting the second cellular communication has a higher priority than a third node supporting the DC, and the third node supporting the DC has a higher priority than a first node supporting the first cellular communication.

4. The electronic device of claim 1, wherein the at least one communication processor is configured to:
receive, from the application processor, a signal requesting searching for the node to be registered;
in response to receiving the signal, disable searching the node to be registered until updating the database is completed; and
enable searching the node to be registered when updating the database is completed.

5. The electronic device of claim 1, wherein the at least one communication processor is configured to, in response to determining that the at least one communication processor fails to search the node to be registered based on the database comprising information for previously registered nodes before receiving at least one of the first system information or the second system information, update the database based on at least one of the first system information or the second system information.

6. The electronic device of claim 1, wherein the at least one communication processor is configured to:
identify a country in which the electronic device is positioned; and
receive at least one of the first system information or the second system information that is broadcast using a representative frequency band of the first cellular communication of the country.

7. The electronic device of claim 1, wherein the at least one communication processor is configured to, in response to determining that the at least one communication processor fails to search the node to be registered based on the updated database, search a first node supporting a first cellular communication via entire frequency bands supported by the at least one communication processor.

8. The electronic device of claim 7, wherein the at least one communication processor is configured to search the first node from a lower frequency band among the entire frequency bands.

9. The electronic device of claim 1, wherein:
the first system information comprises a system information block (SIB) 2 that comprises information indicating an upper layer of the first cellular communication; and the at least one communication processor is configured to determine whether a first node supports the DC based on the information indicating the upper layer of the first cellular communication.

10. The electronic device of claim 1, wherein:
the second system information comprises an SIB 24; and
the at least one communication processor is configured to identify, based on the second system information, information for a second node supporting the second cellular communication.

11. The electronic device of claim 1, wherein the database comprises at least one of a frequency band of the first cellular communication supported by the at least one node, public land mobile network (PLMN) information of the at least one node, identification information of a cell corresponding to the at least one node, a frequency band of the second cellular communication supported by another node adjacent to the at least one node, or physical identification information of the other node adjacent to the at least one node.

12. An operation method of an electronic device, comprising:
receiving, from at least one node via a first cellular communication, at least one of a first system information comprising a first information that indicates whether the at least one node supporting the first cellular communication supports dual connectivity (DC) or a second system information comprising a second information for an adjacent node that is adjacent to the at least one node and supports a standalone mode of a second cellular communication;
before receiving the at least one of the first system information or the second system information, storing a database comprising information for previously registered nodes, wherein the information for the previously registered nodes includes, for each respective previously registered node included in the database:
a third information indicating whether the respective previously registered node supports dual connectivity (DC), and
a fourth information indicating whether an adjacent node that is adjacent to the respective previously registered node supports the standalone mode of the second cellular communication;
updating, based on the received at least one of the first system information or the second system information, the database to comprise the first information and the second information in addition to the third information and the fourth information;
determining, based on the updated database, a searching order of one or more nodes included in the updated database, wherein the searching order is determined to search the adjacent at least one node supporting the standalone mode of the second cellular communication prior to other nodes; and
searching a node to be registered based on the determined searching order,
wherein the update the database comprises:
in response to determining, when at least one communication processor is activated, that the at least one communication processor fails to search the node to be registered based on the database, updating the database based on at least one of the first system information and the second system information before receiving, from an application processor, a signal requesting searching for the node to be registered.

13. The operation method of claim 12, wherein determining the searching order comprises:
determining a priority based on a cellular communication type supported by the at least one node included in the updated database; and
determining the searching order based on the determined priority.

14. The operation method of claim 13, wherein the priority is determined such that a second node supporting the second cellular communication has a higher priority than a third node supporting the DC, and the third node supporting the DC has a higher priority than a first node supporting the first cellular communication.

15. The operation method of claim 12, further comprising:
receiving a signal requesting searching for the node to be registered;
in response to receiving the signal, disabling searching the node to be registered until updating the database is completed; and
enabling searching the node to be registered when updating the database is completed.

16. The operation method of claim 12, further comprising, before receiving at least one of the first system information or the second system information, updating the database based on at least one of the first system information or the second system information, in response to determining that the electronic device fails to search the node to be registered based on the database comprising information for previously registered nodes.

17. The operation method of claim 12, wherein receiving at least one of the first system information or the second system information comprises:
identifying a country in which the electronic device is positioned; and
receiving at least one of the first system information or the second system information that is broadcast using a representative frequency band of the first cellular communication of the country.

18. The operation method of claim 12, further comprising searching a first node supporting a first cellular communication via entire frequency bands supported by the electronic device, in response to determining that the electronic device fails to search the node to be registered based on the updated database.

19. The operation method of claim 18, wherein searching the first node supporting the first cellular communication comprises searching for the first node from a lower frequency band among the entire frequency bands.

20. The operation method of claim 18, further comprising:
identifying whether the first node supports DC based on information indicating an upper layer of the first cellular communication; and
identifying, based on the second system information, information for a second node supporting the second cellular communication,
wherein the first system information comprises a system information block (SIB) 2 that comprises the information indicating the upper layer of the first cellular communication, and
wherein the second system information comprises an SIB 24.

* * * * *